US006999628B2

(12) United States Patent
Simard et al.

(10) Patent No.: US 6,999,628 B2
(45) Date of Patent: Feb. 14, 2006

(54) TARP FILTER

(75) Inventors: Patrice Y. Simard, Bellevue, WA (US);
Henrique S. Malvar, Sammamish, WA (US); Dinei Afonso Ferreira Florencio, Redmond, WA (US); David Willard Steinkraus, Santa Fe, NM (US)

(73) Assignee: Microsoft Corporation, Redmond, WA (US)

( * ) Notice: Subject to any disclaimer, the term of this patent is extended or adjusted under 35 U.S.C. 154(b) by 667 days.

(21) Appl. No.: 10/109,419

(22) Filed: Mar. 28, 2002

(65) Prior Publication Data

US 2003/0190080 A1 Oct. 9, 2003

(51) Int. Cl.
*G06K 9/36* (2006.01)

(52) U.S. Cl. .................... 382/238; 382/251

(58) Field of Classification Search ............. 382/224, 382/232–251, 260–261; 358/539; 341/51; 348/404.1; 375/240.02, 240.12, 240.19
See application file for complete search history.

(56) References Cited

U.S. PATENT DOCUMENTS

| | | | | |
|---|---|---|---|---|
| 5,867,605 A | * | 2/1999 | Oliveras et al. | 382/260 |
| 5,903,676 A | * | 5/1999 | Wu et al. | 382/244 |
| 6,253,165 B1 | | 6/2001 | Malvar | |
| 6,292,194 B1 | | 9/2001 | Powell, III | |
| 6,678,419 B1 | * | 1/2004 | Malvar | 382/240 |

OTHER PUBLICATIONS

Alistair Moffat, et al.; "Arithmetic Coding Revisited"; ACM Transactions on Information Systems, vol. 16, No. 3, Jul 1998, pp. 256-294.
Henrique S. Malvar; "Fast Adaptive Encoder for Bi-Level Images"; pp. 1-10.
Henrique S. Malvar; "Biorthogonal and Nonuniform Lapped Transforms for Transform Coding with Reduced Blocking and Ringing Artifacts"; Revised: Oct. 20, 1997; To Appear: IEEE Transactions on Signal Processing: Apr. 1998, pp. 1043-1053.
Scott M. Lopresto, et al.; "Image Coding Based on Mixture Modeling of Wavelet Coefficients and a Fast Estimation-Quantization Framework"; Data Compression Conference, Snowbird, Utah, To Appear Mar. 1997; pp. 1-10.
Aaron Deever, et al.; "What's Your Sign?: Efficient Sign Coding for Embedded Wavelet Image Coding"; Cornelll University; p. 1-10.
Henrique S. Malvar; "Fast Progressive Wavelet Coding"; Presented at the IEEE DCC '99 Conference-Snowbird, Utah, Mar./Apr. 1999; pp. 1-8.
Richard O. Duda, et al.; "Pattern Classification and Scene Analysis"; Copyright1973, by John Wiley & Sons, Inc.; pp. 1-482.
R. J. Stevens, et al.; "Manipulation and Presentation of Multidimensional Image Data Using The Peano Scan"; IEEE Transactions on Pattern Analysis and Machine Intelligence, vol. PAMI-5, No. 5, Sep. 1983; pp. 520-526.

* cited by examiner

*Primary Examiner*—Joseph Mancuso
*Assistant Examiner*—Duy M. Dang
(74) *Attorney, Agent, or Firm*—Amin & Turocy, LLP

(57) ABSTRACT

Systems and methods for performing adaptive filtering are disclosed. The present invention generates probabilities that can be used in an encoder, such as an arithmetic encoder and generates those probabilities in a computationally efficient manner. Probabilities of previously encoded coefficients are employed, effectively, in generating probabilities of the coefficients without regard to directional information. Thus, a large amount of information is adaptively and efficiently used in generating the probabilities. For the coefficients, the probability is computed based at least partly on at least one probability of a previously computed probability of a neighboring coefficient. Then, the coefficients are encoded using those computed probabilities.

69 Claims, 14 Drawing Sheets

TARP FILTER

TECHNICAL FIELD

The present invention relates generally to document image processing, and more particularly to adaptive filtering.

BACKGROUND OF THE INVENTION

The amount of information available via computers has dramatically increased with the wide spread proliferation of computer networks, the Internet and digital storage means. With such an increased amount of information has come the need to transmit information quickly and to store the information efficiently. Data compression is a technology that facilitates effectively transmitting and storing of information Data compression reduces an amount of space necessary to represent information, and can be used for many information types. The demand for compression of digital information, including images, text, audio and video has been ever increasing. Typically, data compression is used with standard computer systems; however, other technologies make use of data compression, such as but not limited to digital and satellite television as well as cellular/digital phones.

As the demand for handling, transmitting and processing large amounts of information increases, the demand for compression of such data increases as well. Although storage device capacity has increased significantly, the demand for information has outpaced capacity advancements. For example, an uncompressed image can require 5 megabytes of space whereas the same image can be compressed and require only 2.5 megabytes of space without loss of information. Thus, data compression facilitates transferring larger amounts of information. Even with the increase of transmission rates, such as broadband, DSL, cable modem Internet and the like, transmission limits are easily reached with uncompressed information. For example, transmission of an uncompressed image over a DSL line can take ten minutes. However, the same image can be transmitted in about one minute when compressed thus providing a tenfold gain in data throughput.

In general, there are two types of compression, lossless and lossy. Lossless compression allows exact original data to be recovered after compression, while lossy compression allows for data recovered after compression to differ from the original data. A tradeoff exists between the two compression modes in that lossy compression provides for a better compression ratio than lossless compression because some degree of data integrity compromise is tolerated. Lossless compression may be used, for example, when compressing critical text, because failure to reconstruct exactly the data can dramatically affect quality and readability of the text. Lossy compression can be used with images or non-critical text where a certain amount of distortion or noise is either acceptable or imperceptible to human senses. Data compression is especially applicable to digital representations of documents (digital documents). Typically, digital documents include text, images and/or text and images. In addition to using less storage space for current digital data, compact storage without significant degradation of quality would encourage digitization of current hardcopies of documents making paperless offices more feasible. Striving toward such paperless offices is a goal for many businesses because paperless offices provide benefits, such as allowing easy access to information, reducing environmental costs, reducing storage costs and the like. Furthermore, decreasing file sizes of digital documents through compression permits more efficient use of Internet bandwidth, thus allowing for faster transmission of more information and a reduction of network congestion. Reducing required storage for information, movement toward efficient paperless offices, and increasing Internet bandwidth efficiency are just some of many significant benefits associated with compression technology.

Compression of digital documents should satisfy certain goals in order to make use of digital documents more attractive. First, the compression should enable compressing and decompressing large amounts of information in a small amount of time. Secondly, the compression should provide for accurately reproducing the digital document.

One commonly used approach to encoding documents and images is to use a compression scheme or system that utilizes probabilities. For example, an arithmetic encoder, which is widely used, obtains good compression by using sophisticated models and using probabilities for the data to be encoded. Generally, the better or closer the probabilities are, the better the compression achieved. Arithmetic coding can code close to entropy, which is the average amount of information per symbol, given a probability distribution of the possible symbols. It is not possible to code better than entropy. Typically, coders such as arithmetic encoders, rely on a large, fixed context to generate their probabilities. However, the computation of these probabilities can be computationally expensive and time consuming. Furthermore, the fixed context used generally requires training using previously encoded data, as in classical adaptive arithmetic encoders, in order to yield a satisfactory context. Thus, if an image is encoded with quickly changing, noisy, or too complex a distribution for adaptation, poor compression is usually obtained. Thus, the conventional coders fail to adequately adapt to the image being encoded.

SUMMARY OF THE INVENTION

The following is a summary of the invention in order to provide a basic understanding of some aspects of the invention. This summary is not intended to identify key/critical elements of the invention or to delineate the scope of the invention. Its sole purpose is to present some concepts of the invention in a simplified form as a prelude to the more detailed description that is presented later.

The present invention relates generally to systems and methods for encoding and decoding images, and, more specifically to adaptively generating probabilities of coefficients and/or pixels of images to be used in encoding and decoding the images. Probabilities are used by an encoder to compress the image. Generally, the better or more accurate the probabilities, the more compression that is obtained. However, generating more accurate probabilities is conventionally a computationally expensive process. Thus, the present invention generates probabilities in a computationally efficient manner. Previously encoded coefficients are used, effectively, in generating probabilities of the coefficients without regard to directional information. Thus, a large amount of information is adaptively and efficiently used in generating the probabilities. For each of the coefficients, the probability is computed based at least partly on at least one probability of a previously computed probability of a neighboring coefficient.

An encoding system including a tarp filter and an encoder is disclosed. The filter is called "Tarp filter" because its impulse response function resemble a tarp being lifted on the side. The tarp filter adaptively compute probabilities for transform coefficients of an image, the probabilities being a function of probabilities of previously coded transform coefficients. The encoder encodes the transform coefficients utilizing the probabilities generated by the tarp filter.

An adaptive filter system comprising a learning rate component, an observed value component, a previously coded values component and an estimator is disclosed. The learning rate component stores a learning rate parameter—the learning rate parameter can be predetermined and/or dynamically adjusted. The observed value component stores and provides observed values of coefficients. The previously coded values component stores and provides previously computed probabilities of previously encoded coefficients. The estimator generates probabilities for the coefficients as a function of learning rate parameter, the previously coded values and the previously computed probabilities.

A method of encoding a document or image is disclosed. Pixels of an image are transformed into coefficients or transform coefficients using some form of pre-processing, usually a linear transform such as Fourier, cosine, wavelet or lapped transform. The coefficients are quantized by dividing the coefficients by a quantization value and rounding up to a nearest integer. Probabilities for the coefficients are generated based at least partly on previously computed probabilities of previously encoded coefficients. The coefficients are encoded into a bitstream by utilizing the generated probabilities.

A method of decoding a document or image is disclosed. Probabilities for coefficients are generated utilizing previously computed probabilities of previously decoded coefficients. The probabilities are employed to decode encoded coefficients. The decoded coefficients can be transformed into pixel values.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

DETAILED DESCRIPTION OF THE INVENTION

Figure 1:
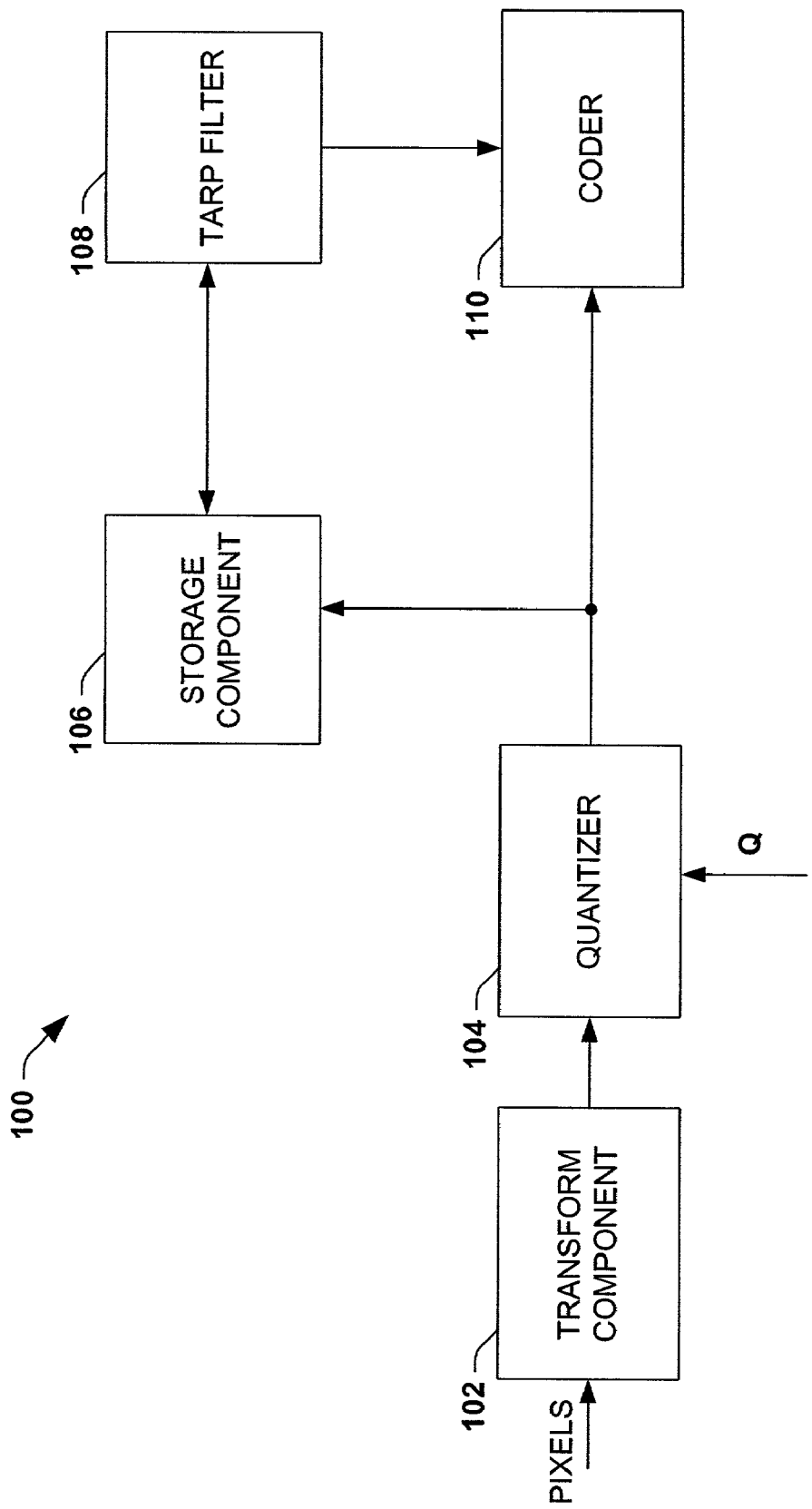
FIG. 1 is a block diagram of an image encoding system according to one aspect of the invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "component" is intended to refer to a computer-related entity, either hardware, a combination of hardware and software, software, or software in execution. For example, a component can be, but is not limited to being, a process running on a processor, a processor, an object, an executable, a thread of execution, a program, and a computer. By way of illustration, both an application running on a server and the server can be a component. One or more components can reside within a process and/or thread of execution and a component may be localized on one computer and/or distributed between two or more computers.

Further, "document image" is intended to refer to a digital representation of document(s) comprising one or more color(s) (e.g., binary (e.g., black/white), gray-scale and/or color document(s)). Additionally, a document image can have image(s), text and/or text with images. A document image can comprise binary, RGB, YUV and/or other representations of document(s). An RGB document image is represented red, green and blue components. A YUV document image is represented using a luminescence component denoted by Y and chrominance components denoted by U and V. The YUV representation is, generally, more compressible because the YUV components are correlated to each other. Other linear combinations of RGB can also be employed (e.g., YCrCb, HSV, YIQ, etc). A document image comprises picture elements commonly referred to as "pixels". A document image can be based on single or multi-page document(s) of any suitable shape or size.

FIG. 1 is a block diagram of an image encoding system 100 according to one aspect of the invention. The system 100 encodes an image in a computationally efficient manner by using previous values to compute a probability for a current coefficient. The system 100 includes a transform component 102, a quantizer 104, a storage component 106, a tarp filter 108 and a coder 110.

The transform component 102 operates on or receives an image and generates a number of coefficients from the image. The image can include any suitable number of colors and/or levels. The image can also be of any suitable size or resolution, such as for example 640 by 480 pixels and/or 200 dots per inch (dpi). Pixels of the image are transformed into the coefficients or the transform coefficients in order to improve compression of the image. The coefficients can be, for example, wavelet coefficients. Other types of suitable coefficients (e.g., lapped transform coefficients) can also be used in accordance with the present invention. The coefficients can be reordered and/or grouped in blocks or bands that correspond to different resolution or features of pixels of the image. For instance, in wavelets transforms, the bands HL0, LH0, HH0 respectively denote the result of horizontal high pass followed by a vertical low pass filter at the highest resolution, the results of horizontal low pass followed by a vertical high pass filter at the highest resolution, and the results of horizontal high pass followed by a vertical high pass filter at the highest resolution. The bands HL1, LH1, HH1 correspond to applying the same filters to a lower resolution image. The coefficients map or transform smoothness from the image data or pixel values and concentrate information in another domain. By performing such a transform, the coefficients can be more correlated and can compress better. The input to the quantizer 104 and to the system in general can be any or any combinations of these blocks or bands.

The quantizer 104 receives the coefficients from the transform component 102 and quantizes them. This quantization involves dividing the coefficients by a quantization step Q and then rounding the coefficients to a nearest integer. The coefficients, after being quantized, can also be referred to as indices. The quantization step Q can be adjusted to increase or decrease compression. Higher compression is obtained by increasing the quantization step Q, which decreases the entropy, information content, since more coefficients quantize to zero. However, it is to be appreciated that higher compression comes at a cost of possibly losing some information from the image. Similarly, the amount of lost information from the image can be decreased by reducing the quantization step Q, but at a potential cost of decreasing compression. The quantizer 104 causes the encoding system to be lossy, which is usually acceptable for images. Indeed, the encoding system can be adapted to be lossless by bypassing the quantizer 104 and avoiding quantizing the transform coefficients. The quantizer 104 then sends the coefficients, after being quantized, to the storage component 106 and the coder 110.

The storage component 106 stores probabilities of previously coded coefficients. The previously coded coefficients are coefficients that have previously been encoded by the coder 110. The storage component 106 is updated with probabilities as coefficients are encoded by the coder 110. The storage component 106 provides the probabilities as needed.

The tarp filter 108 adaptively computes a probability density function for the coefficients. The tarp filter 108 updates the probability density function adaptively based on each of the transform coefficients. The probabilities of previously coded coefficients are used, but are weighted exponentially, according to their respective distance from a current transform coefficient. Thus, coefficients closer to the current transform coefficient have a greater impact on the probability density function than coefficients further away. Also, the probability density function is not related to a direction. This non-reliance on directional information permits simplification of computing the probabilities and the probability density function. Additionally, tarp filter 108 is generally isotropic, meaning that the filter response has loose circular symmetry centered on the pixel or the current transform coefficient to be predicted because the probabilities are not based on directional information, just distance. This loose circular symmetry is demonstrated by TABLE 1, described below with respect to FIG. 4. However, this isotropic nature can prevent the tarp filter 108 from capturing some information such as some edge positions or other complex patterns. The tarp filter 108 can also be referred to as a probability estimator.

One approach that can be used to compute the probabilities used in the probability density function is to compute a probability for each coefficient based on a probability of at least one neighboring coefficient. Thus, the probabilities for each coefficient propagate onto the next probability to be computed and so on. Other approaches, such as are described with further details in FIG. 2 and FIG. 3, and variations thereof can be used in accordance with the present invention.

Additionally, the tarp filter 108 can use an adjustable learning rate parameter a to control the adaptation speed of the filter 108. The learning rate parameter a controls the adaptation speed in creating the probability density function. The learning rate parameter a is adjustable between a range of values, typically 0 and 1. Thus, the adaptation speed of the tarp filter can be dynamically adjusted or preset by setting or modifying the learning rate parameter a. Additionally, for noisy images, the learning rate parameter a can also be used as a smoothing factor by slowing the adaptation rate of the filter 108.

The coder 110 receives the probabilities or the probability density function from the tarp filter 108 and encodes the coefficients. Typically, the coefficients are encoded, one by one and in order. However, as stated above, the coefficients can be reorganized to improve compression. The coder 110 encodes each coefficient using the probability density function received from the tarp filter 108. The coder 110 can be any suitable type of encoder, such as an arithmetic encoder. The ability of the coder 110 to compress the coefficients is related to the closeness or accuracy of the probabilities and the probability density function. Thus, the probabilities, determined adaptively by the tarp filter 108, permit the coder 110 to encode the coefficients with relatively high compression.

It is appreciated that a decoding system according to an aspect of the invention comprises components similar to that of the encoding system 100. However, the coder 110 is replaced with a decoder that decodes coefficient utilizing probabilities.

Figure 2:
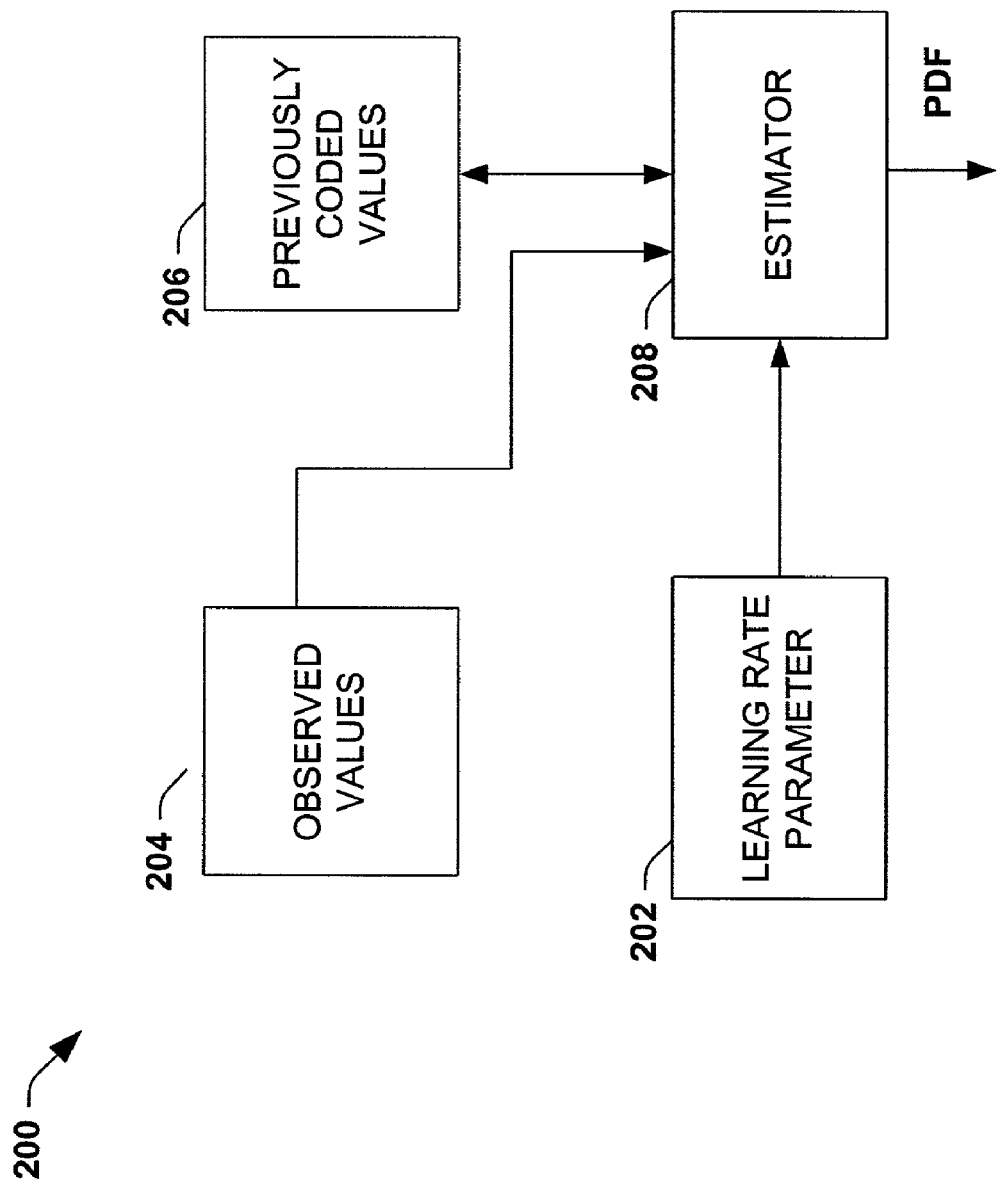
FIG. 2 is a block diagram of a one dimensional tarp filter according to one aspect of the invention.

FIG. 2 is a block diagram of a one dimensional tarp filter 200 according to an aspect of the invention. The filter 200 generates probabilities for transform coefficients that can be used by an arithmetic encoder. The filter 200 computes a probability for each transform coefficient, singularly. Additionally, the filter 200 generates the probabilities by scanning an image, one line at a time and adaptively generating a probability for a next transform coefficient. The filter 200 includes a learning rate parameter component 202, an observed value component 204, a previously coded values component 206 and a probability estimator 208. The filter 200 can be used in an encoding systems such as the system described with respect to FIG. 1. Also, the filter 200 is described with respect to a binary image, but can be extended to non-binary images of coefficients by operating on bitplanes.

The learning rate parameter component 202 stores a, a learning rate parameter and provides a to the estimator 208. The learning rate parameter a controls how quickly the estimator 208 adapts probabilities to the data or observed values. Thus, the learning rate parameter a can be increased to have the estimator 208 adapt probabilities to observed values more slowly or decreased to have the estimator 208 adapt probabilities to observed values more quickly. The learning rate parameter a can also be increased and/or set high for a noisy image so that the learning rate parameter a can act as a smoothing factor. Typically, the learning rate parameter a has a range of values from 0 to 1, however it is appreciated that other aspects of the invention can use a different range of values. The value of the learning rate parameter a can be predetermined by the learning rate parameter component 202, dynamically adjusted by the learning rate parameter component 202, modified by a user input and the like.

The observed value component 204 provides observed values for transform coefficients, including an observed value for a current transform coefficient. The current transform coefficient is at a current position and is one of the transform coefficients of an image. The previously coded values component 206 stores previously computed probabilities that have been computed for previous transform coefficients and provides those previously computed probabilities to the estimator 208, as needed.

As stated above, the estimator 208 generates probabilities for the transform coefficients. For the next transform coefficient, the estimator 208 generates a probability for the next transform coefficient as a function of the learning rate parameter a, the previously computed probabilities and the observed value of the current transform coefficient. The estimator 208 can assume that the transform coefficients are a stream of 0s and 1s generated by an unknown distribution, but for which the ones are locally correlated.

An example of one of many suitable implementations for the estimator 208, is when a signal v[t] is one dimensional, as opposed to an image. Such a one dimensional filter helps define the convention and notation employed to generalize this filter to two dimensions. As the bits come in, an estimate can be computed by the estimator 208 of the probability of 1 by using the following formula:

$$p[t]=v[t]\times(1-a)+p[t-1]\times a \qquad \text{Eq. 1}$$

where p[t] is the estimate of the probability of obtaining a 1 for position t+1, the next transform coefficient, v[t] is the observed value a position t, a is between 0 and 1 and models how quickly the probability adapts to the data.

It is easy to show that p is the convolution of v with the function $f$, where $f(t)=a^t(1-a)$ for $t \geq 0$ and $f(t)=0$ for $t<0$. It is also easy to show that $f$ is probability density function (bounded by 0 and 1, with the integral summing to unity), and that for every 1 in the data stream v, p is computing a sum of parzen windows, shaped by $f$. If v is skewed toward 1, p (the probability that v outputs 1) tends toward 1, while if v is skewed toward 0, p adapts toward 0. If v is a random stream, p tends toward 0.5. The parameter a models the speed of adaptation of p. If the data stream is noisy, p should adapt slowly to avoid modeling the noise. If the data is clean, a should be closer to 0 so that p can track the true probability quickly.

An advantage of this algorithm, Eq. 1, is that it can compute a useful probability estimate for v very efficiently. Of course this depends on the distribution of v, which is not usually known before generating the probabilities.

Figure 3:
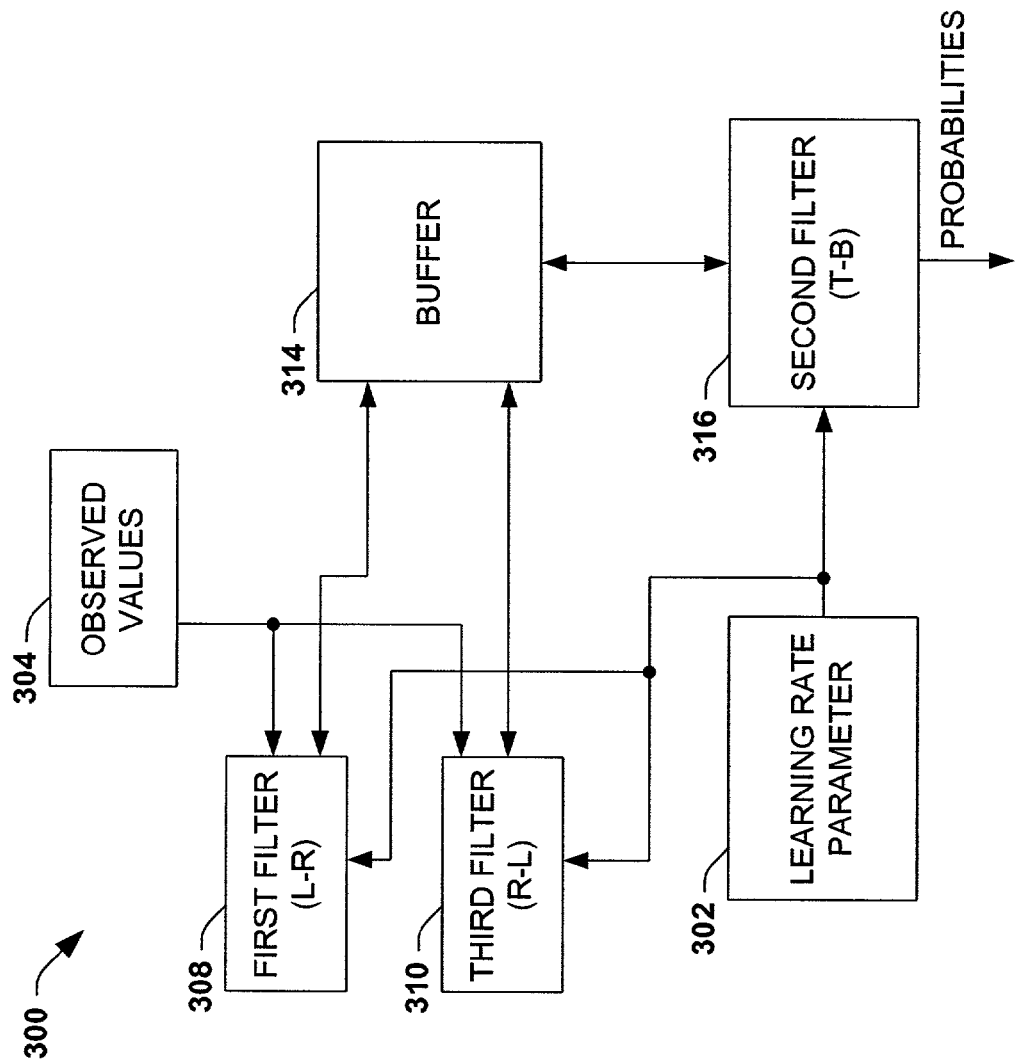
FIG. 3 is a block diagram of a two dimensional tarp filter according to one aspect of the invention.

FIG. 3 is a block diagram of a two dimensional tarp filter 300 according to one aspect of the invention. The filter 300 is operable on binary and non-binary images. Image can refer to image of pixels, image of transform coefficients, or image of portions (block or bands) of transform coefficients. The filter 300 generates probabilities for transform coefficients that can be used by an arithmetic encoder. The filter 300 computes a probability for each transform coefficient, one at a time. Additionally, the filter 300 generates the probabilities by scanning the image, one line at a time and adaptively generating a probability for a next transform coefficient. The filter 300 includes a learning rate parameter component 302, an observed value component 304, a first filter 308, a second filter 310, a buffer 314 and a third filter 316. It is possible for the 3 filters 308, 310 and 316 to have different and independent learning rates, but for simplification only one common learning rate is assumed in the figure. The filter 300 can be used in an encoding systems such as the system described with respect to FIG. 1. Also, the filter 300 is described with respect to a non-binary image, but it is appreciated that alternate aspects can include a binary image. Again image here can refer to image of pixels, image of transform coefficients, or image of portions (block or bands) of transform coefficients.

Each coefficient is coded using probability estimates made from previously coded coefficients. Since the image is scanned from left to right, and top to bottom, only the information in lines above or coefficients to the left of the coefficient to be coded, can be used in computing probabilities. When the tarp filter is used on a single image (or a single band/block), three filters are used to compute the probabilities. The probabilities are computed by combining the probability estimate of a first filter (left to right) and second filter (top to bottom). The third filter (left to right) is only invoked at the end of a line, and its result can only for the next line since only information of previously encoded coefficients can be used.

The first filter 308 scans an image, line by line, from left to right, pixel by pixel. For each pixel, the first filter 308 computes a probability for a current pixel using previously encoded information to the left of the pixel to be coded. The current pixel is represented by a current transform coefficient. Then, after computing the probability for the current pixel, the first filter updates its left estimate. The update of the left estimate of the current pixel is a function of an observed value (actual value) of the current pixel, the learning parameter a and the previous left estimate. The observed value is obtained from the observed value component 304. The second filter 316 operates independently for each column. It updates its estimate from the previous above estimate, which it reads from the previous line, for each column. The previous above estimate carries information computed by the third filter 310 on the previous line. The left estimate and the above estimate are probability estimates. The probability of the current pixel is a function of the above estimate (pixel above the current pixel), a left estimate (pixel to the left) and a learning parameter a. The learning parameter controls the responsiveness or adaptability of each filter. Each filter could have an independent learning parameter and the learning parameters could themselves be adapted from the data. The updated above estimate is a function of the updated left estimate, the learning parameter a and the previous above estimate of the above pixel. The above estimates for the pixels in the row are also referred to as row probabilities. The probabilities computed by the first filter 308 are stored in the buffer 314, as well as all other previous estimates.

The third filter 310 operates on a full line after the first filter 308 has finished processing the full line. The third filter 310 operates from right to left, pixel by pixel. The row probabilities are updated as a function of the learning parameter a, previous row probabilities and the observed value. The previous row probabilities are received from the buffer 314. The updated row probabilities are also stored in the buffer 314.

The second filter 316 probability estimates are then updated a second time, at the same time as the third filter 310, so that the information to the right of each pixel can be propagated downward for the next line of coefficients.

The learning rate parameter component 302 stores a, the learning rate parameter and provides a to the first filter 308, the second filter 316 and the third filter 310. The learning rate parameter (a) controls how probabilities adapt to the data or observed values. Thus, the learning rate parameter (a) can be increased to have the probabilities adapt to observed values more slowly or decreased to have the probabilities adapt to observed values more quickly. The learning rate parameter (a) can also be increased and/or set high for a noisy image so that the learning rate parameter (a) can act as a smoothing factor. Typically, the learning rate parameter (a) has a range of values from 0 to 1. The value of the learning rate parameter (a) can be predetermined by the learning rate parameter component 302, and can be fixed or dynamically adjusted on the fly as a function of the data. Additionally, alternate aspects of the invention can have different and/or independent learning rates for each filter. The rational for doing so resides in the fact that some bands, as for instance the wavelet HL and LH are not symmetric horizontally and vertically. The observed value component 304 provides an observed value for a current transform coefficient or pixel. The current transform coefficient is at a current position and is one of the transform coefficients of an image.

The operation of the first filter 308, the second filter 316 is summarized by the following equations:

$$p[i, j] = (p1[i, j-1] + p2[i-1, j]) \times a$$

$$p1[i, j] = v[i, j] \times (1-a)^2/(2a) + p1[i, j-1] \times a \quad \text{Eq. 2}$$

$$p2[i, j] = p1[i, j] + p2[i-1, j] \times a$$

where p is the true probability of v being 1 (it doesn't depend on v[i, j] which has not yet been seen). The probability p is computed from the left probability estimate p1[i, j−1] and the above probability estimate p2[i−1, j]. Next, the left probability estimate is updated using the actual value v[i, j]. Note that the normalizing coefficient $2(1-a)^2/a$ facilitates the sum of the probability equaling 1, as stated above.

Finally, the probability p2[i, j] is updated for use in the next row computation. Note that p2[i, j] implements a vertical decay of the probabilities for each column. Once a full row has been coded, the row probabilities p2 are updated one more time by running a third filter p3 backward (from right to left) shown as component 310:

$$p2[i, j] = p2[i, j] + p3[i, j+1] \times a$$

$$p3[i, j] = v[i, j] \times (1-a)^2/(2a) + p3[i, j+1] \times a \quad \text{Eq. 3}$$

Note that the second filter 316 which computes p2 is also updated in the right to left pass. This computation, using Eq. 1, 2 and 3 can be viewed as an effective way to implement a convolution with the function depicted in FIG. 4. Note that the support of this function is strictly causal (only depends on previously seen pixel). The convolution can be viewed as a sum of Parzen windows, and the result is an accurate density estimator for 1 in the binary stream v[i, j].

The initial conditions are given by:

$$p2[-1, -1] = \epsilon \times (1+a)/(2a)$$

$$p2[-1, j] = p2[-1, j-1] \times (1+a)/(a^2+1) \quad \text{Eq. 4}$$

$$p1[i, -1] = p2[i-1, 0] \times (1-a)/(1+a)$$

where $\epsilon = 0.001$ is the a-priori estimate of the probability of v[i, j] being 1. It should be noted that only the scalars p1[i−1, j] and p3[i, j+1] and the row of scalar p2[i−1,:] are stored in the buffer 314.

Eq. 1, 2, 3 and 4 are described with respect to binary transform coefficients for ease of illustration. For non-binary coefficients, a bitplane representation is used of the non-binary transform coefficients and the binary bitplanes are encoded independently. To generalize to non-binary coefficient, the bitplane representation of the integer coefficient are processed and encoded independently. The sign bit for each coefficient is sent whenever the absolute value of the coefficient is non zero.

It is appreciated that the filter 300 is described as computing probabilities for bitplanes independently for illustrative purposes only. It is appreciated that aspects of the present invention can employ information from a previously encoded bitplane, when computing probabilities of the current bitplane.

Figure 4:
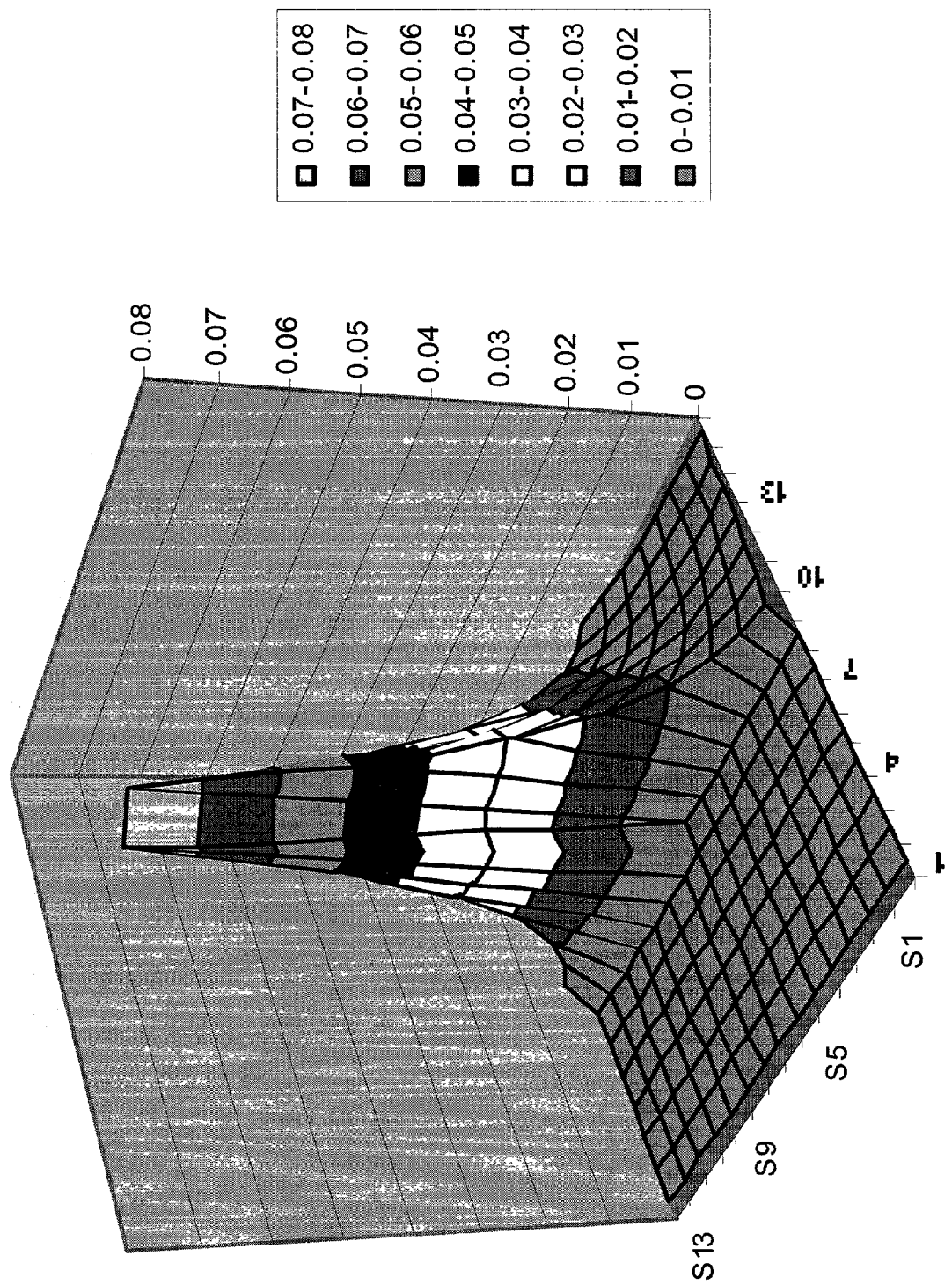
FIG. 4 illustrates a typical impulse response for a tarp filter.

FIG. 4 illustrates a typical impulse response for the tarp filter 400. It can be seen from FIG. 4 that the impulse response has a "tarp like" appearance, of which the name of the tarp filter 400 is derived from. The table below shows the typical impulse response of the tarp filter 400 for a pixel centered at the rectangle, and a=0.5.

TABLE 1

TYPICAL IMPULSE RESPONSE

| | | | | | | | | | |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0.1250 | 0.0625 | 0.0313 | 0.0156 | 0.0078 |
| 0.0078 | 0.0156 | 0.0313 | 0.0625 | 0.1250 | 0.0625 | 0.0313 | 0.0156 | 0.0078 | 0.0039 |
| 0.0039 | 0.0078 | 0.0156 | 0.0313 | 0.0625 | 0.0313 | 0.0156 | 0.0078 | 0.0039 | 0.0020 |
| 0.0020 | 0.0039 | 0.0078 | 0.0156 | 0.0313 | 0.0156 | 0.0078 | 0.0039 | 0.0020 | 0.0010 |
| 0.0010 | 0.0020 | 0.0039 | 0.0078 | 0.0156 | 0.0078 | 0.0039 | 0.0020 | 0.0010 | 0.0005 |

Alternate variations of the tarp filter 400 of FIG. 4. can be employed in accordance with the present invention. In particular, the learning rate parameter (a) can be made different for horizontal or vertical directions; multiple probability estimates can be computed based on different subsets of the available data and averaged according to some weight reflecting the confidence on each estimate; the filters can be run directly on the multilevel data (instead of binary data or bit-planes) and other suitable variations. Furthermore, the probabilities can be estimated through a two-step process, where instead of directly estimating a probability (as described before), the coefficients are used to estimate one or more parameters of a given probability distribution. As an illustration, another variation of a tarp filter is described below with respect to FIG. 5.

The basic principle is that of estimating the probability of a certain coefficient to be encoded, based on the information that has already been encoded, e.g., previous coefficients, previous bands, previous bit-planes and the like. In particular, several of these estimates can be computed simultaneously and averaged, possible using different weights.

Figure 5:
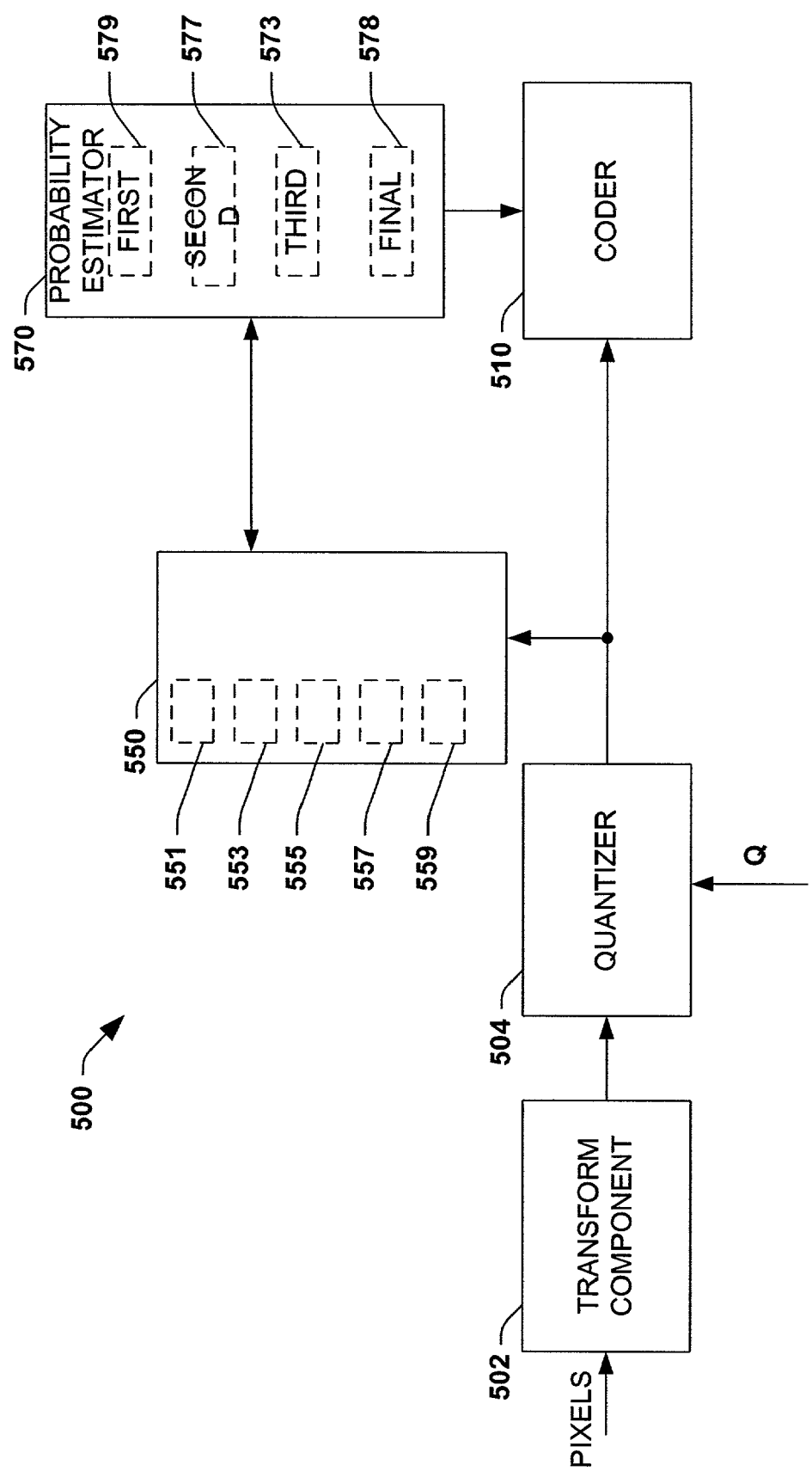
FIG. 5 is a block diagram of an image encoding system according to one aspect of the invention.

FIG. 5 is a block diagram illustrating an image encoding system 500 according to one aspect of the invention. The system encodes an image in a computationally efficient manner by using previous values to compute a probability for a current coefficient. The system 500 includes a transform component 502, a quantizer 504, a storage component 550, a probability predictor 570, and a coder 510. The storage component 550 stores probabilities of previously computed coefficients and can optionally include one or more independent storage components. For example, it can be appropriate to encode each band at a time or each bit-plane at a time, or both. Furthermore, the encoding can follow an row-wise scan, a column-wise scan, a zigzag scan, or any other suitable scan ordering. Thus, the storage component 550 can include a storage component storing data from a previously completed phase of the encoding. For example, the storage component 550 can contain a storage element 553 for storing previously computed coefficients of bands, a storage element 555 for storing previously computed coefficients of a bit-plane, a storage element 557 for the previously computed coefficients of a row of coefficients already encoded in the current band and/or bit-plane, a storage component 559 for the current coefficients already encoded in the current row, and a storage element 551 for storing previously transmitted data, coefficients or parameters. It is appreciated that the meaning of row can be interchanged promptly with column, or with a subset of the scan pattern being used. The probability predictor 570 uses information from the storage component 550 to compute a discrete probability distribution function for a current symbol and provides that probability to the coder 510. The probability predictor can utilize information contained in the storage component 550 concurrently or independently. However, complexity of the information can be reduced if it is used in a compartmentalized way.

The probability predictor 570 includes one or more of the following probability estimators. A first probability estimator 579 computes a probability estimate based on the previous coefficients encoded for a particular row of coefficients. This probability estimate could be computed by using a 1-D tarp filter, such as described with respect to FIG. 2. The first probability estimator can compute the probability estimate utilizing Eq. 1. Similarly, a second probability estimator 577 computes a probability estimate based on a previously computed row of coefficients. This probability estimate could, for example, be computed utilizing Eq. 2 and 3. A third probability estimator 573 computes a probability estimate using a previously encoded band. For this probability estimate, a symmetric tarp-like filter can be used, where an extra pass in the reverse row direction is computed after the data from the whole band is available. This computation by the third probability estimator 573 can be viewed as a generalization of the two dimensional tarp filter to three dimensions. A three dimensional tarp filter could be used directly on transform coefficients if the data was three dimensional, as in the case, for instance, in video. Other suitable probability estimators can be utilized to compute probability estimates. A final probability estimate is obtained by a final estimator 578 by computing a weighted mean of the probability estimates obtained from the one or more probability estimators. The mean is weighted based on the confidence of each estimate. This final probability estimate is then provided to the coder 510 which encodes the symbol. Note that the symbol is also passed on to the storage component 550 to be used in estimating probability for remaining symbols.

In another aspect of the invention, the probabilities are not computed directly. Instead, it is assumed that a coefficient to be encoded comes from a given family of probability distribution functions (PDF) and available data for a given family of PDF is employed to compute one or more parameters of that PDF.

A PDF family is chosen which is believed to be representative of the probability distribution for the data being encoded. For example, assume direct encoding of each coefficient of the wavelet transform (not a binary or bit-plane signal). A Laplacian distribution is typically chosen as representing the probability distribution of such wavelet coefficients. In the case of a Laplacian distribution, only one parameter is needed to fully characterize the PDF and obtain probabilities for each symbol: the symbol variance. Therefore the available data is employed to estimate such variance.

It is appreciated that a decoding system that decodes an encoded image (e.g., image encoded via system 500) is implemented with similar components to system 500. However, a decoder is utilized instead of the coder 510. The decoding system comprises a probability estimator and a decoder. The probability estimator adaptively computes probabilities for transform coefficients of an image or encoded image. The probabilities are a function of probabilities of previously decoded transform coefficients and a decreasing function of a distance of previously decoded transform coefficients. Other suitable computations of the probabilities, including computations described with respect to FIG. 2 and FIG. 5 can be employed. The decoder or entropy decoder decodes transform coefficients utilizing the probabilities.

Figure 6:
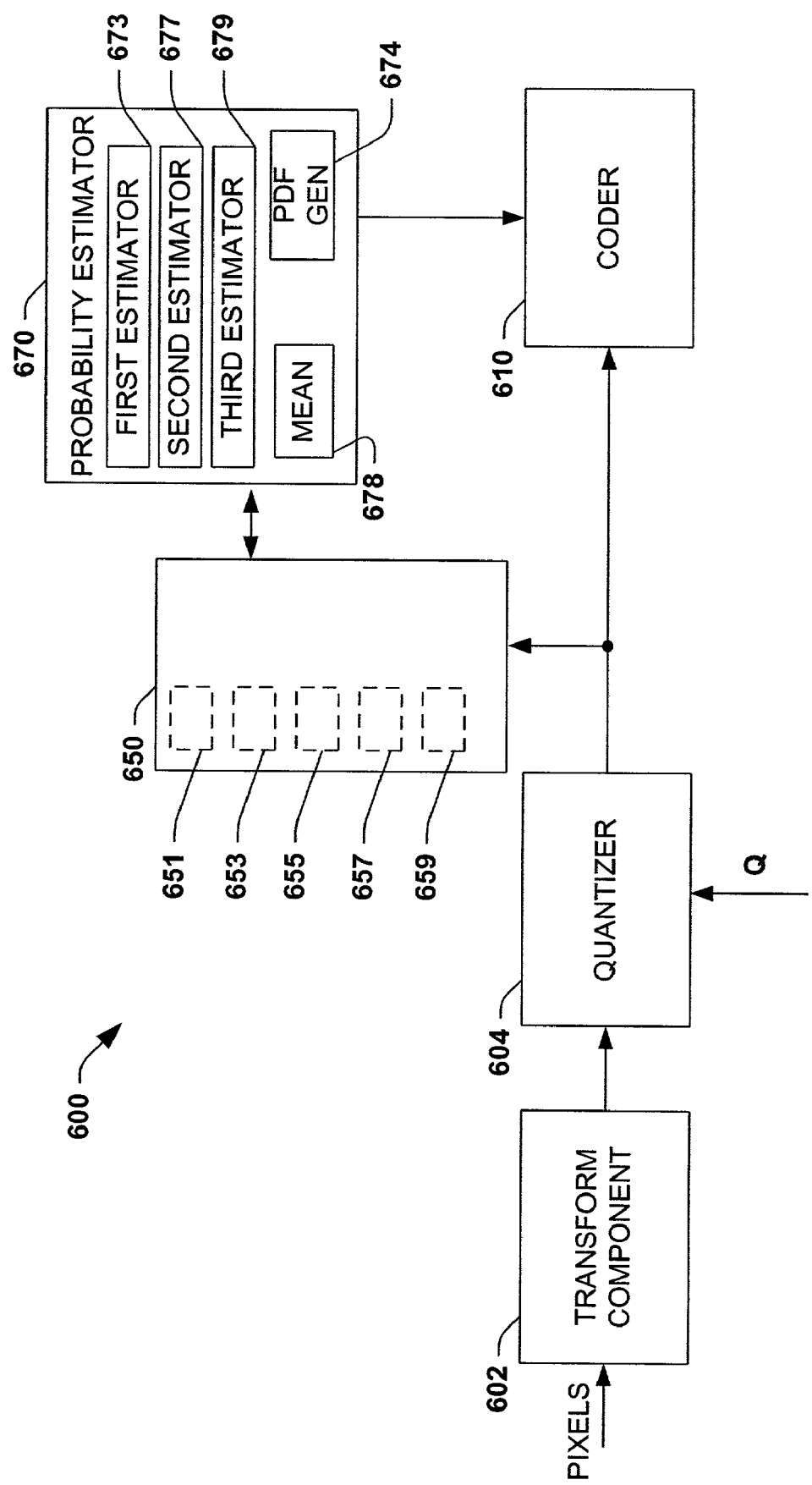
FIG. 6 is a block diagram of an image encoding system according to one aspect of the invention.

FIG. 6 is a block diagram of an image encoding system 600 according to an aspect the present invention. The system 600 includes a transform component 602, a quantizer 604, a storage component 650, a probability estimator 670, and a coder 610. The probability estimator 670 comprises three variance estimators; a first variance estimator 673, a second variance estimator 677, and a third variance estimator 679; a weighted mean component 678, and a discrete PDF generator 674.

The transform component 602 and the quantizer 604 operate in a similar manner to the transform component 502 and the quantizer 504 described in FIG. 5. The storage component 650 stores previously transmitted coefficients, values, and any other suitable parameters sent as side information. The storage component 650 can optionally be subdivided into one or more storage elements such as, a storage element for a current row 659, a storage element for a previously completed row 657, and storage element for all previously computed bands 653. Each of the three variance estimators 673, 677, and 679 estimate a variance for a current coefficient based on a sub-set of the data contained in 650. The first variance estimator 679 estimates the variance Var1 based only on the current row of coefficients. More precisely, at position (i,j) the first variance estimator 679 estimates the variance recursively from the coefficients already transmitted, by using the following:

$$\mathrm{Var1}[i, 0]=(v[i, 0])^2$$

$$\mathrm{Var1}[i, j]=a\times\mathrm{Var1}[i, j-1]+(1-a)\times(v[i, j])^2, \text{ for } i>0 \quad \text{Eq. 6}$$

Note first that this estimate uses values from the same row, and to the left of the symbol v[i,j]. Note also that the variance is squared in order to obtain an estimate of the variance. Also, the recursive nature of the computation provides that the estimate has low computational requirement.

The second variance estimator 677 estimates the variance Var2 based only on the previously completed rows of coefficients. More precisely, at position (i,j) the second variance estimator 677 estimates the variance recursively from the coefficients already transmitted, by using the following:

$$\mathrm{Var}L[i, 0]=(v[i, 0])^2$$

$$\mathrm{Var}L[i, j]=a\times\mathrm{Var}L[i, j-1]+(1-a)\times(v[i, j])^2, \text{ for } i>0$$

$$\mathrm{Var}R[i, N]=(v[i, N])^2$$

$$\mathrm{Var}R[i, j]=a\times\mathrm{Var}R[i, j+1]+(1-a)\times(v[i, j])^2, \text{ for } i<N \quad \text{Eq. 7}$$

$$\mathrm{Var}LR[i, j]=\mathrm{Var}R[i, j]+\mathrm{Var}L[i, j]$$

$$\mathrm{Var2}[1, j]=\mathrm{Var}LR[1, j]$$

$$\mathrm{Var2}[i, j]=b\times\mathrm{Var2}[i-1, j]+(1-b)\times\mathrm{Var}LR[i, j], \text{ for } i>1$$

Note that a different learning factor is employed for the row-wise decay (a), and for the column-wise decay (b). Note also that any estimate uses samples from completed rows of coefficients.

Any suitable number of estimates can be produced. In this aspect, the third variance estimator 673 produces one more estimate Var3, based on a previously completely encoded band. We note that in a wavelet transform there is strong correlation between the locations of high value coefficients across bands of same type. For example, a sharp edge is likely to produce high value coefficients across all bands, which will all have the same relative location. Depending on the orientation of the edge, these high-value coefficients will mostly appear in the Horizontal, Vertical, or Diagonal bands of the transform. Thus, this lower band can be utilized to assist predicting the variance of the coefficients in the current band. The transform component 602 is a traditional dyadic wavelet transform and that transmission starts from the lower resolution bands. Therefore, except for the first band of each type, there exists a previously transmitted band of the same type (horizontal, vertical or diagonal). The third variance estimate is produced by the third variance estimator 673 using data from this previously transmitted band. A similar filter to the ones described above can be utilized, but now also using decay in the reverse row order. One other possible way is to simply use the pixel from the corresponding position at the lower resolution band. The current value is denoted as v[i,j], and the values of the corresponding previous band are denoted as z[i,j]. Note that each column and row of z will be half the size of the column/row in v. Therefore, the third variance estimate can be defined as:

$$\mathrm{Var3}[i, j]=(z[i/2, j/2])^2 \quad \text{Eq. 8}$$

Note that if i/2 or j/2 are not integers, they can be rounded to the lowest integer. Note also that other suitable variance estimates can be run based on the same data.

After obtaining variances estimates from the first variance estimator 679, the second variance estimator 677, and the third variance estimator 673; a weighted mean component 678 computes a combined variance estimate. The combined variance estimate is computed as a mean of weighted estimates from the first variance estimator 679, the second variance estimator 677, and the third variance estimator 617. As an example, assign fixed confidences for each variance estimate, say c1, c2 and c3. Any suitable confidence values can be employed, however some exemplary values employed for weights or confidences c1, c2 and c3 are 3, 6, and 1, for Var1, Var2, and Var3, respectively. Thus, a final combined variance estimate can be computed as:

$$\mathrm{Var}F[i, j]=(c1\times\mathrm{Var1}(i, j-1]+c2\times\mathrm{Var2}[i-1, j]+c3\times\mathrm{Var3}[i, j])/(c1+c2+c3) \quad \text{Eq. 9}$$

It is appreciated that whenever a given estimate is not available (e.g., because it falls out of the image bounds, or because a previous band is not available), the appropriate weight c1, c2, or c3 to zero. Note also that in the variances are indexed such that values are not utilized which are not available from the storage component 650.

Using the final combined variance estimate provided by the weighted mean component 678, the discrete PDF generator 674 produces an estimate of the probability of each symbol. In this aspect, as described above, a Laplacian PDF is assumed to be used. Therefore, the PDF is given by:

$$p(x) = \left(\frac{1}{\sqrt{2}\,\sigma}\right)e^{-\left|\frac{x\sqrt{2}}{\sigma}\right|} \quad \text{Eq. 10}$$

Therefore, given a variance estimate $s^2$=VarF[i,j], and given the knowledge of the quantizer, the discrete PDF generator 674 produces the individual probabilities for each symbol. In particular, in the case of a uniform quantizer, the probability is given by:

$$p(v[i, j] = k) = \int_{k-1/2}^{k+1/2}\left(\frac{1}{\sqrt{2}\,\sigma}\right)e^{-\left|\frac{x\sqrt{2}}{\sigma}\right|}dx \quad \text{Eq. 11}$$

and therefore:

$$p(v[i, j] = 0) = 1 - e^{\frac{1}{\sigma\sqrt{2}}}, \text{ and} \quad \text{Eq. 12}$$

$$p(v[i, j] = k) = \frac{1}{2}\left(e^{-\frac{(|k|-\frac{1}{2})\sqrt{2}}{\sigma}} - e^{-\frac{(|k|+\frac{1}{2})\sqrt{2}}{\sigma}}\right), \text{ for } k \neq 0$$

It is appreciated that other PDF(s) can be used besides the Laplacian, and discrete probabilities computed for each symbol. In some cases other distributions need other parameters, besides the variance. For such cases, estimators for necessary parameters can be added to the probability estimator, as appropriate. The discrete PDF generator 674 computes the probability of each possible value for v[i,j] and provides that to the a coder 610. The coder 610 can be a multi-symbol arithmetic coder, or a similar encoder, which then encodes the given symbol v[i,j] according to the received probabilities. The encoder then goes to the next symbol, repeating the whole procedure.

It is appreciated that a decoding system that decodes an encoded image (e.g., image encoded via system 600) is implemented with similar components to system 600. However, a decoder is utilized instead of the coder 610. The decoding system comprises a probability estimator and a decoder. The probability estimator adaptively computes probabilities for transform coefficients of an image or encoded image. The probabilities are a function of probabilities of previously decoded transform coefficients and a decreasing function of a distance of previously decoded transform coefficients. Other suitable computations of the probabilities, including computations described with respect to FIG. 2, FIG. 5 and FIG. 6 can be employed. The decoder or entropy decoder decodes transform coefficients utilizing the probabilities.

Figure 7:
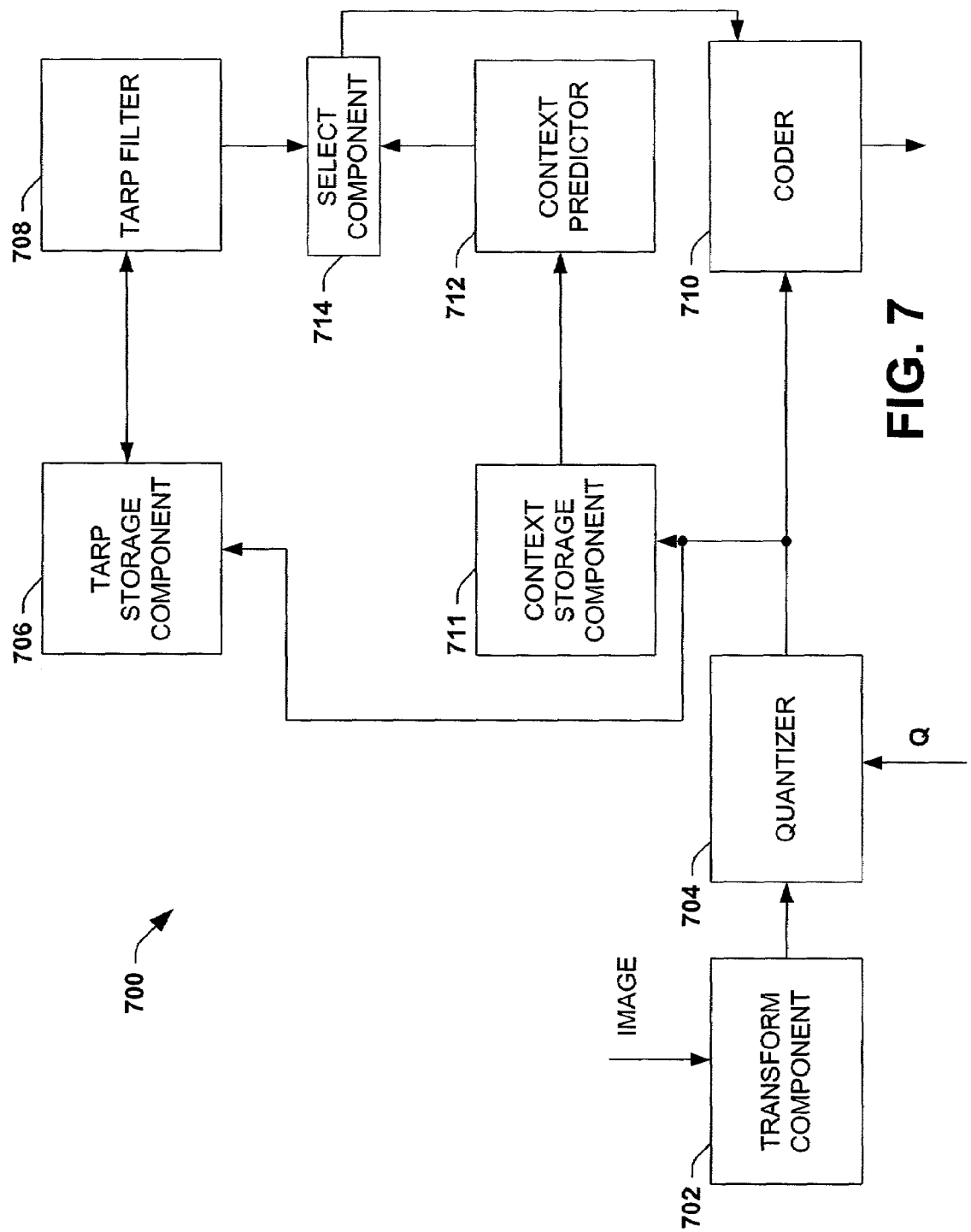
FIG. 7 is a block diagram of an image encoding system according to one aspect of the invention.

FIG. 7 is a block diagram of an image encoding system according to one aspect of the invention. The system encodes an image in a computationally efficient manner by using previous values to compute a probability for a current coefficient. Furthermore, the system includes a transform component 702, a quantizer 704, a tarp storage component 706, a tarp filter 708, a coder 710, a context storage component 711, a context predictor 712 and a select component 714.

Figure 8:
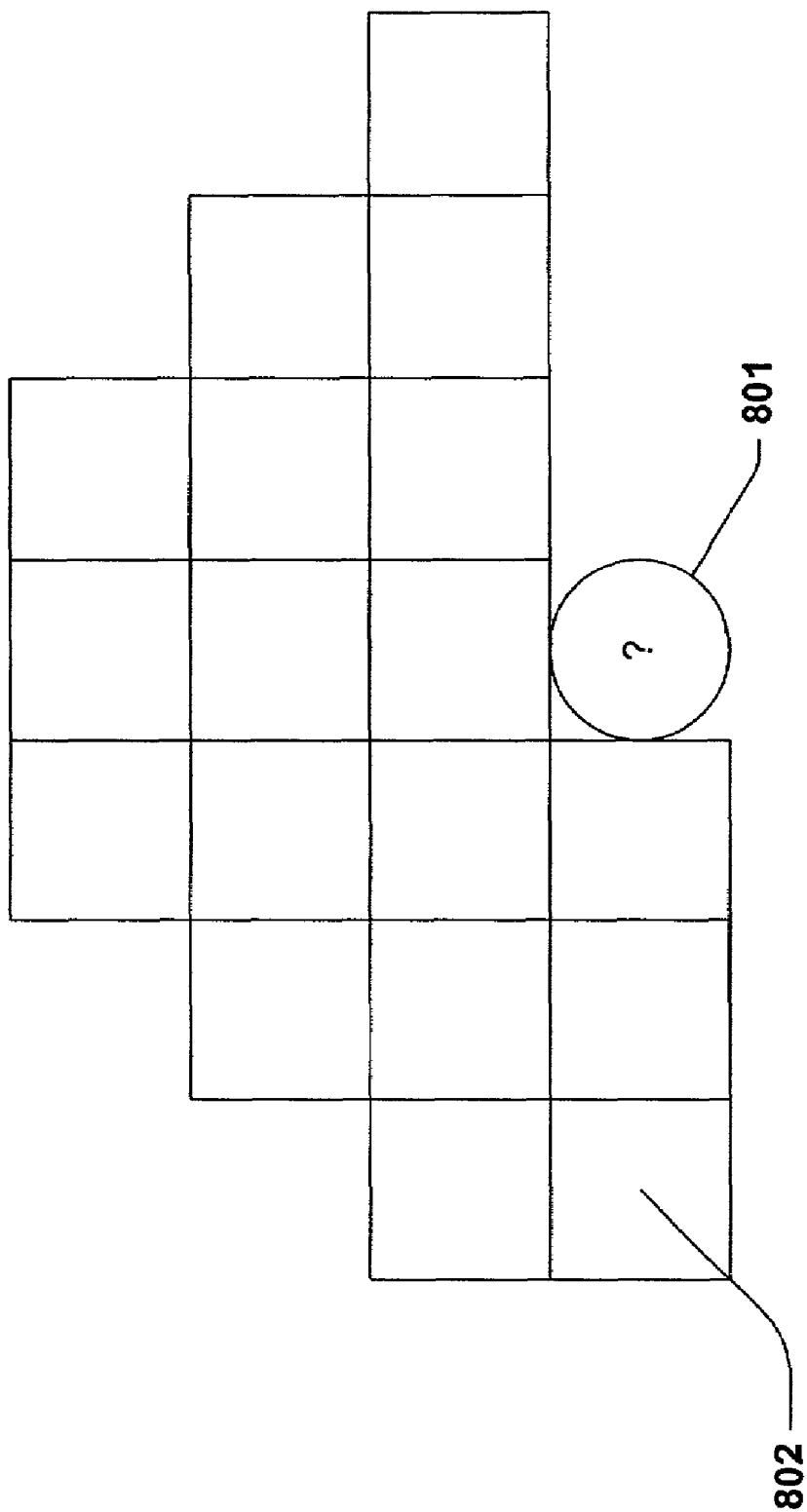
FIG. 8 illustrates an exemplary fixed context that can be used in accordance with the invention.

The encoding system of FIG. 7 is a hybrid system, because it employs the tarp filter 708 and the context predictor 712 to generate probabilities and then selects which probability to use. The tarp filter 708 is able to adapt quickly but has little information on how bits are arranged around the bit to be predicted. The context predictor 712 is complements the tarp filter 708, by utilizing a large context to capture local patterns. The context predictor 712 is trained off line, since the tarp filter 708 is able to capture on-line adaptation. The context predictor 712, according to this aspect of the invention, employs a context of 18 bits and has a shape shown in FIG. 8. FIG. 8 illustrates an 18 bit context 802 pattern that can be used with the context predictor 712. The 18 bit context 802 predicts or generates a probability of a current pixel 801.

The transform component 702 receives an image and generates a number of transform coefficients. Blocks of the number of transform coefficients correspond to blocks of pixels of the image. Essentially, pixel values of the image are transformed into the transform coefficients. The image can include any suitable number of colors and/or levels. The transform coefficients can be, for example, wavelet coefficients. However, other types of transform coefficients can be used. The coefficients can be reordered and/or grouped in blocks or bands that correspond to different resolution or features of pixels of the image. The transform coefficients map smoothness from the image data or pixel values and concentrate information in another domain. Because of this transformation, the transform coefficients are, generally more correlated and can compress better. However, it is appreciated that the transform component 702 can pass pixel values as the transform coefficients.

The quantizer 704 receives the transform coefficients from the transform component 702. The transform coefficents are quantized, divided by a quantization step Q, and then rounded to a nearest integer. The transform coefficients, after being quantized, can also be referred to as indices. The quantization step Q is adjusted to increase or decrease compression. Higher compression is obtained by increasing the quantization step Q, which decreases the entropy since more coefficients quantize to zero. However, that higher compression comes at a cost of losing information from the image. Similarly, the amount of lost information from the image can be decreased by reducing the quantization step Q, but at a cost of decreasing compression. The quantizer 704 causes the encoding system to be lossy, which is usually acceptable for images. The encoding system can be adapted to be lossless by bypassing the quantizer 704 and avoiding quantizing the transform coefficients. The quantizer 704 then sends the transform coefficients, after being quantized, to the storage component 706 and the coder 710.

The tarp storage component 706 stores previously coded coefficients. The previously coded coefficients are transform coefficients that have previously been encoded by the coder 710. The coder 710 encodes the transform coefficients, one by one and in order. For respective coefficients, the coder 710 receives a probability density function from the tarp filter 708. The coder 710 is typically, an arithmetic encoder. The ability of the coder 710 compress the transform coefficients is related to the closeness or accuracy of the probabilities and the probability density function.

The tarp filter 708 adaptively computes a probability density function for the transform coefficients. The tarp filter 708 adaptively updates the probability density function for the transform coefficients. The previously coded coefficients are used but they are weighted, exponentially, according to their distance from the current transform coefficient. Thus, closer coefficients have more impact on the probability density function than farther away coefficients. However, the probability density function is not related to a direction. Thus, the fact that the direction is not needed simplifies the computation of the probability density function. Because the tarp filter 708 does not rely on direction, the tarp filter 708 is isotropic. Isotropic means that the filter response has circular symmetry centered on the pixel to be predicted. This isotropic nature can prevent the tarp filter 708 from capturing information such as edge positions or other complex patterns. The tarp filter 708 is a two dimensional filter and, thus relies on the previously coded coefficients in two directions to compute the probability density function. The probability density function (PDF) generated by the tarp filter 708 is also referred to as a tarp PDF.

Additionally, the tarp filter 708 is adjustable by a learning rate parameter (a). The learning rate parameter (a) controls the adaptation speed in creating the probability density function. The learning rate parameter (a) is adjustable between 0 and 1. The lower the learning rate parameter (a), the more quickly the probability estimate adapts to the data. Additionally, the learning rate parameter (a) can also be viewed as a smoothing factor. Thus, the noisier the data, the higher the learning rate parameter (a) can be set.

The context storage component 711 stores the context used by the context predictor 712. The context is generally developed off line because the tarp filter 708 captures on line adaptation. One approach used to develop the context is to analyze a training set of images. The training set can be a suitable number of images, such as about 20 images. The context is developed by generating a context for respective images and averaging the context from the images into the context stored in the context storage component 711. Typically, the training set should include images similar to images to be coded by the encoding system.

The context predictor 712 uses a fixed context of 18 as shown with respect to FIG. 7. The context predictor 712 retrieves the context from the context storage component 711, as needed. For this aspect of the invention, a context of 18 bits is used. Then, the context predictor 712 generates a probability density function based on the context. The probability function is provided to the select component 714. The probability density function is also referred to as a context PDF.

The select component 712 determines whether the tarp PDF or the context PDF is sent to the coder 710. The select component 712 can select the PDF as a function of the PDFs' values, the previously sent coefficient values or both. One approach to selecting the PDF is to generate a gating function based on the training set used to develop the context for the context storage component 711. The gating function is used to determine, pixel by pixel or coefficient by coefficient, which PDF to use. The gating function can be sent with the encoded bitstream to assist in the decoding process. This process can be forward looking, in the sense that the coder 710 can measure which PDF gives the best compression, and then send information to the decoder for choosing the PDF. Part of the image may be compressed more effectively with Tarp, while part of the image may be compressed more effectively with a context predictor. Alternatively, the values derived using the gating function do not need to be sent if the decisions from the gating function are based on previously sent pixels. Other suitable approaches can be used to select which PDF to use and still be in accordance with the present invention.

The coder 710 receives the PDF from the select component 714. The coder uses the PDF to encode the coefficients received from the quantizer 704. The coder 710 is typically an arithmetic encoder. The coder generates an encoded bitstream and/or a file.

It is appreciated that a decoding system can be implemented in accordance with the present invention similar to the encoding system of FIG. 7. However, the coder is replaced with a decoder and probabilities are based on previously decoded coefficients as opposed to previously encoded coefficients.

Figure 9:
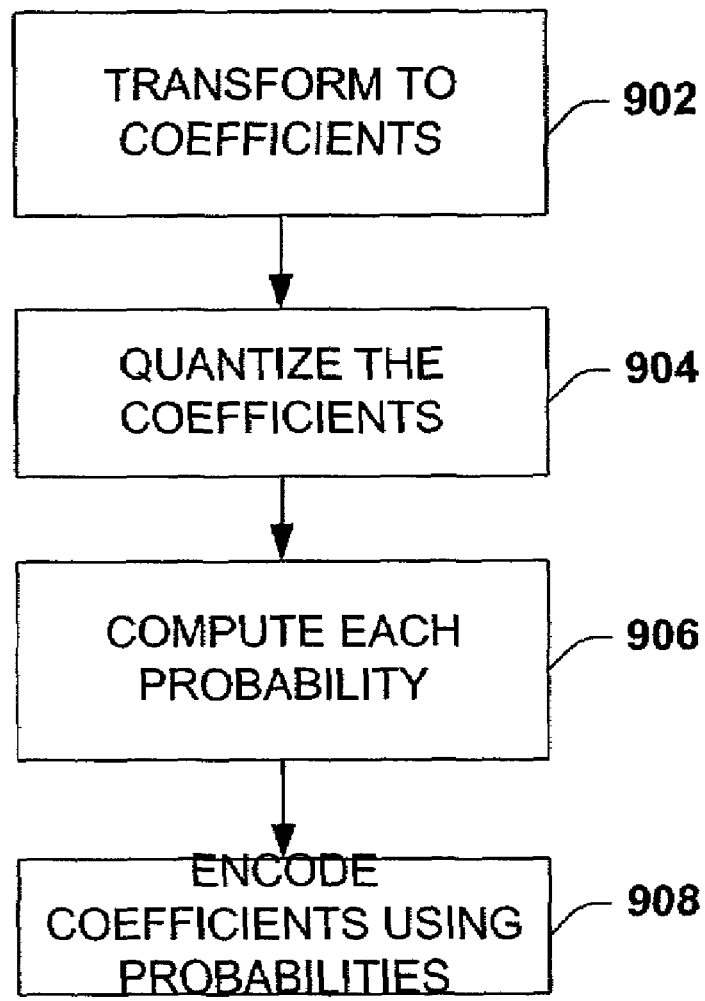
FIG. 9 is a flow diagram of a method of encoding a document according to one aspect of the invention.

FIG. 9 is a flow diagram of a method of encoding a document according to one aspect of the invention. The method adaptively encodes an image by utilizing previously computed probabilities and an observed value. The method operates isotropically, meaning that directional information is not required. Thus, the method can encode images in a computationally efficient manner.

Pixels of an image are transformed into coefficients at 902. The image can include any suitable number of colors and/or levels. The image can be of any suitable size and/or resolution, such as 640 by 480 pixels in size and 200 dpi resolution. The coefficients can be any suitable coefficient, such as, for example wavelet transform coefficients and lapped transform coefficients. Additionally, the coefficients can be the pixel values from the image. The coefficients can be reordered and/or grouped in blocks corresponding to blocks of pixels in the image.

The coefficients are quantized at 904. This quantization involves dividing the coefficients by a quantization step or value Q and then rounding the coefficients to the nearest integer. The coefficients, after being quantized, can also be referred to as indices. The value of Q can be adjusted to increase or decrease compression. Generally, a lower Q decreases entropy thereby increasing compression while a higher Q increases entropy thereby lowering compression.

For the respective coefficients, a probability is generated based on previously computed coefficients at 906. The probability computation typically utilizes a learning parameter a and an observed value. The learning parameter a controls the adaptation rate for the probability generation. Generally, a lower learning parameter a causes the probability generation to adapt more quickly while a higher learning parameter a causes the probability generation to adapt more slowly. According to one aspect of the invention, the learning rate parameter a has an adjustable value between 0 and 1.

Usually, all of the previously computed coefficients are utilized to generate the probabilities. However, directional information is not required. Additionally, the distance of previously computed probabilities of coefficients is used to reduce the effect of those computed probabilities on a computation of probability for a current coefficient. Thus, the further from a current coefficient, the less impact the corresponding previously computed probability has on computing the current coefficient's probability.

The probabilities are used to encode the coefficients at 908 into a bitstream. A coder such as an arithmetic encoder can be used to encode the coefficients. After encoding, the bitstream can be stored as a file, transferred to another process or application and the like. The encoded bitstream can be decoded similar to the encoding described above. Probabilities are generated based on previously decoded coefficients and a decreasing function of the previously decoded coefficients instead of previously encoded coefficients. The coefficients are then decoded based on those probabilities.

Figure 10:
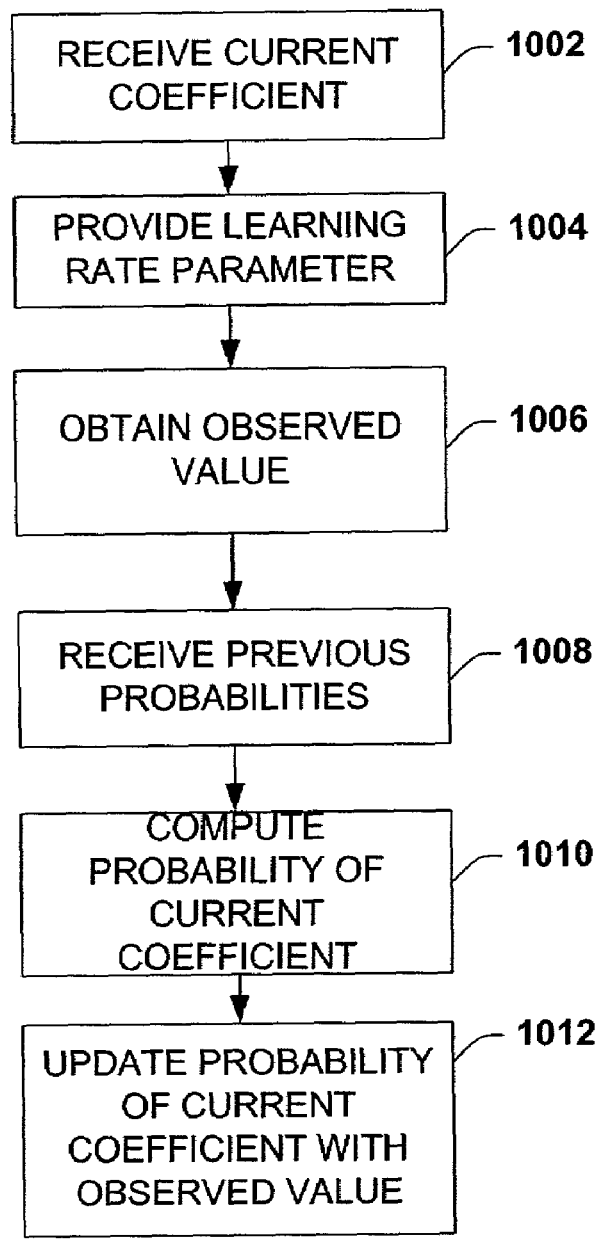
FIG. 10 is a flow diagram of a method of operating a one dimensional filter according to one aspect of the invention.

FIG. 10 is a flow diagram of a method of operating a one dimensional filter according to one aspect of the invention. The filter generates probabilities for coefficients transformed from pixels of an image. The filter utilizes previously computed probabilities for a current line of the image. The probabilities can be used by an encoder, such as an arithmetic encoder, to compress the image. The method is described in terms of a single coefficient and probability for that coefficient. However, it is appreciated that the method can be repeated to compute probabilities for all of the coefficients for an image.

A current coefficient is received at 1002. The coefficient is one of the coefficients of the image. The coefficients are normally generated by performing transforms on pixels of an image. The coefficients are typically processed in order by the method. The current coefficient is typically from a line of the image, the line being processed from left to right. A learning rate parameter is provided at 1004. The learning rate parameter can be predetermined, set by a user or dynamically determined. The learning rate parameter adjusts the adaptation rate of the filter. An observed value for the current coefficient is obtained at 1006. Previously computed probabilities are received at 1008. The previously computed probabilities are probabilities based on other coefficients in the same line as the current coefficient.

A probability of the current coefficient is computed at 1010. The probability is computed as a function of the learning rate parameter and the previously computed probabilities. Typically, the probability of the previous coefficient, the coefficient to the left of the current coefficient, is used. This probability can be used by an encoder to compress the current coefficient. The probability of the current coefficient is updated at 1012 according to the observed value. Eq. 1, described with respect to FIG. 2 can be used to compute the probability.

Figure 11:
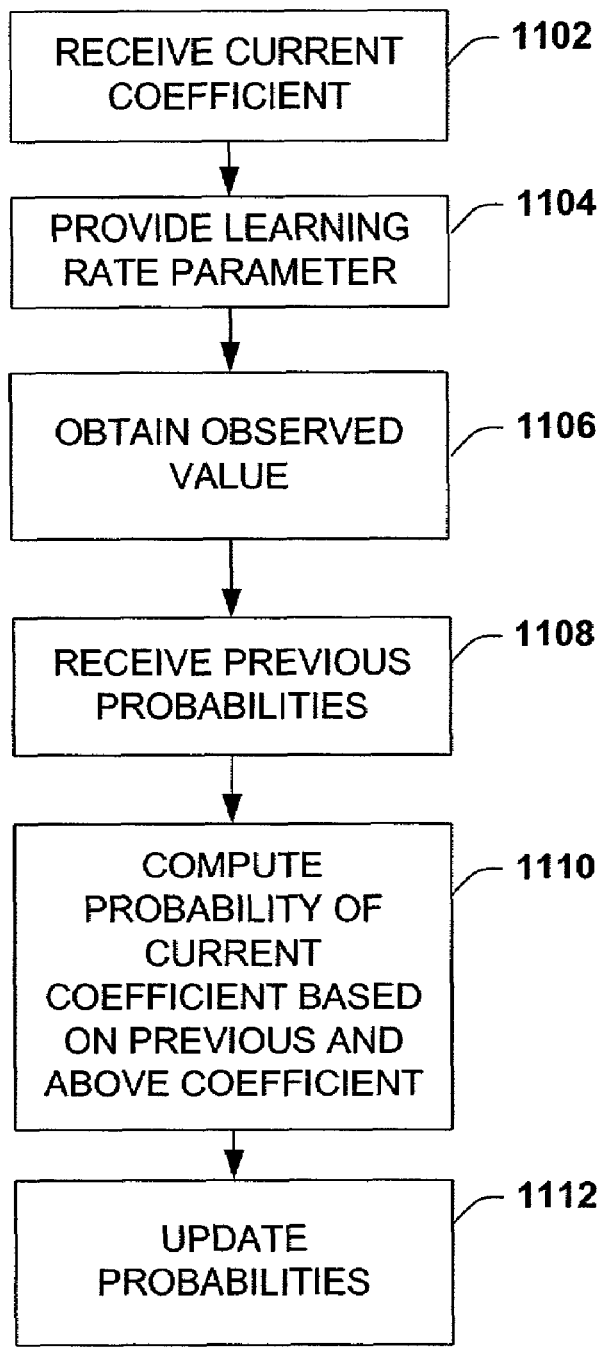
FIG. 11 is a flow diagram of a method of operating a two dimensional filter according to one aspect of the invention.

FIG. 11 is a flow diagram of operating a two dimensional filter according to one aspect of the invention. The filter generates probabilities for coefficients transformed from pixels of an image. The filter utilizes previously computed probabilities for a current line of the image. The probabilities can be used by an encoder, such as an arithmetic encoder, to compress the image. The method is described in terms of a single coefficient and probability for that coefficient. However, it is appreciated that the method can be repeated to compute probabilities for all of the coefficients for an image.

A current coefficient is received at 1102. The coefficient is one of the coefficients of the image. The coefficients are normally generated by performing transforms on pixels of an image. The coefficients are typically processed in order by the method. The current coefficient is from a location of the image, where the coefficients of the image are processed from top to bottom, left to right. A learning rate parameter is provided at 1104. The learning rate parameter can be predetermined, set by a user or dynamically determined. The learning rate parameter adjusts the adaptation rate of the filter. An observed value for the current coefficient is obtained at 1106. Previously computed probabilities are received at 1108. The previously computed probabilities are probabilities based on other coefficients of the image, the other coefficients having already been processed by the method.

A probability of the current coefficient is computed at 1110. The probability is computed as a function of the learning rate parameter and the previously computed probabilities, specifically the probability of a previous coefficient, the coefficient to the left of the current coefficient and the probability of an above coefficient, the coefficient above the current coefficient. All of the previously computed probabilities can be used. This probability of the current coefficient can be used by an encoder to compress the current coefficient. The probability of the current coefficient is updated at 1112 according to the observed value. Additionally, the probabilities of the previous coefficient and the above coefficient can also be updated. Eqs. 2, 3 and 4, described with respect to FIG. 3, can be used to compute the probabilities of this method. It is appreciated that the above can be utilized with respect to a decoder in accordance with the present invention.

Figure 12:
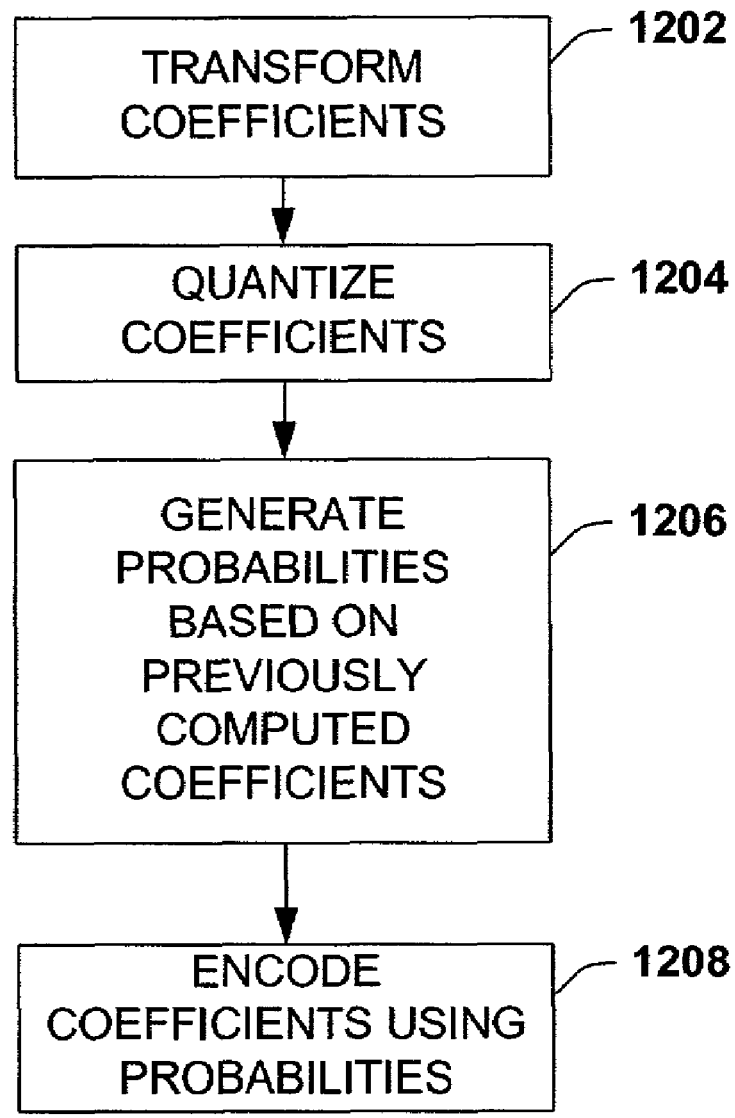
FIG. 12 is a flow diagram of a method of operating an encoding system according to one aspect of the invention.

FIG. 12 is a flow diagram of operating an encoding system according to one aspect of the invention. The method adaptively encodes an image by computing a first probability utilizing previously computed probabilities and a second probability utilizing a fixed context and selecting one of the first and second probabilities that results in better compression. Thus, the method can encode images in a computationally efficient manner by taking advantage of two different probabilities and selecting the better one.

Pixels of an image are transformed into coefficients at 1202. The image can include any suitable number of colors and/or levels. The image can be of any suitable size and/or resolution, such as 640 by 480 pixels in size and 200 dpi resolution. The coefficients can be any suitable coefficient, such as, for example wavelet transform coefficients and lapped transform coefficients. Additionally, the coefficients can be the pixel values from the image. The coefficients can be reordered and/or grouped in blocks corresponding to blocks of pixels in the image, or grouped in blocks or bands of a transformed coefficient image.

The coefficients are quantized at 1204. This quantization involves dividing the coefficients by a quantization step or value Q and then rounding the coefficients to the nearest integer. The coefficients, after being quantized, can also be referred to as indices. The value of Q can be adjusted to increase or decrease compression. Generally, a lower Q decreases entropy thereby increasing compression while a higher Q increases entropy thereby lowering compression.

For the respective coefficients, a probability is generated based on previously computed coefficients at 1206. The probability computation typically utilizes a learning rate parameter (a) and an observed value. The learning rate parameter (a) controls the adaptation rate for the probability generation. Generally, a lower learning rate parameter (a) causes the probability generation to adapt more quickly while a higher learning rate parameter (a) causes the probability generation to adapt more slowly. According to one aspect of the invention, the learning rate parameter (a) has an adjustable value between 0 and 1.

Typically, all of the previously computed coefficients are utilized to generate the probabilities, but it is to be appreciated that a subset of previously computed utilized coefficients can include all of the previously computed coefficients, or substantially all of the previously computed coefficients, or even a lesser amount of the previously computed coefficients if desired). However, directional information is not required. Additionally, the distance of previously computed probabilities of coefficients is used to reduce the effect of those computed probabilities on a computation of probability for a current coefficient. Thus, the further from a current coefficient, the less impact the corresponding previously computed probability has on computing the current coefficient's probability.

The probabilities are used to encode the coefficients at 1208 into a bitstream. A coder such as an arithmetic encoder can be used to encode the coefficients. After encoding, the bitstream can be stored as a file, transferred to another process or application and the like. The bitstream can be decoded utilizing a method of decoding according to an aspect of the invention. The method employs previously decoded coefficients instead of previously encoded coefficients.

Figure 13:
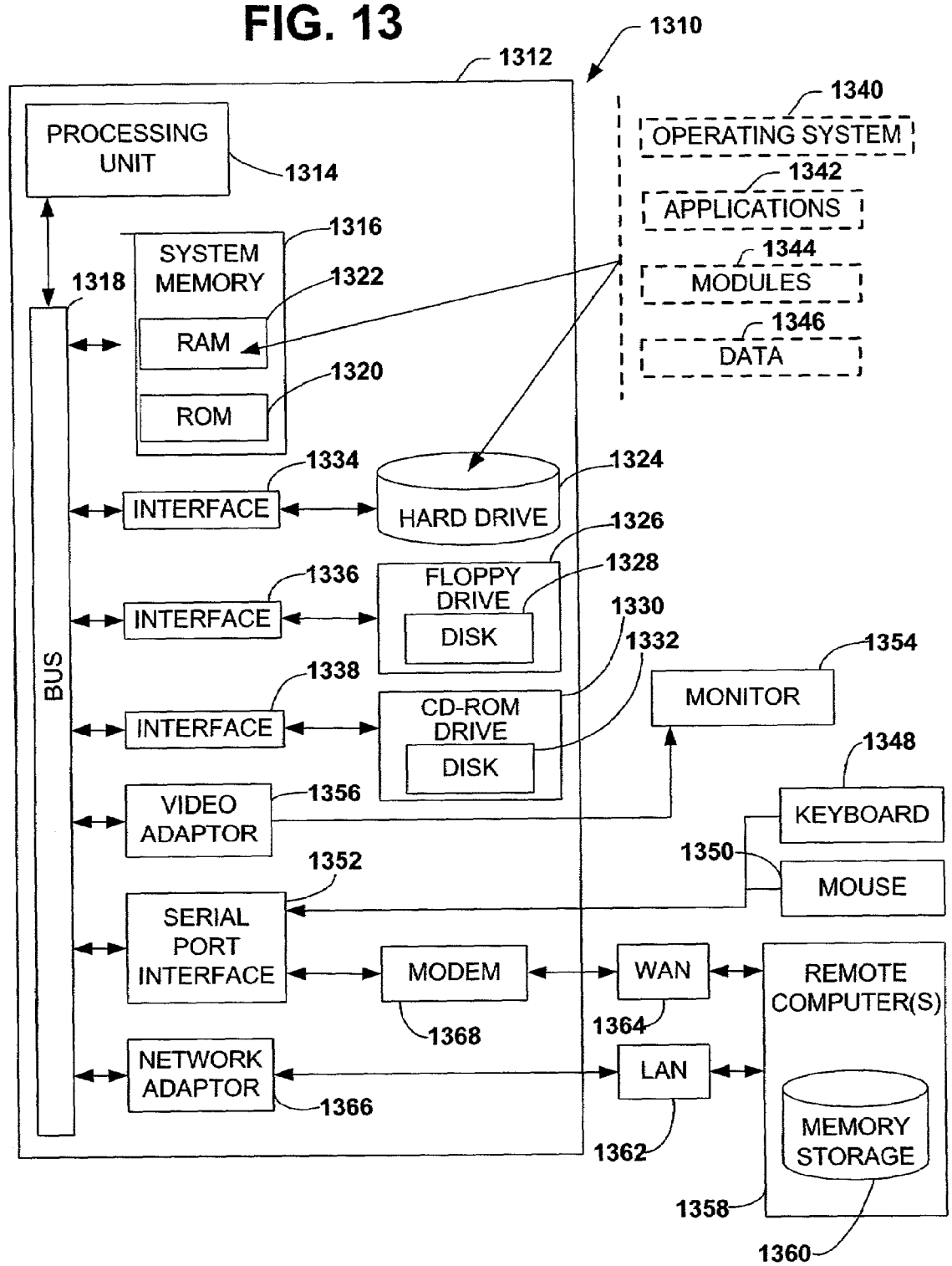
FIG. 13 illustrates an exemplary operating environment in which the present invention may function.

With reference to FIG. 13, an exemplary environment 1310 for implementing various aspects of the invention includes a computer 1312, including a processing unit 1314, a system memory 1316, and a system bus 1318 that couples various system components including the system memory to the processing unit 1314. The processing unit 1314 may be any of various commercially available processors. Dual microprocessors and other multi-processor architectures also can be used as the processing unit 1314.

The system bus 1318 may be any of several types of bus structure including a memory bus or memory controller, a peripheral bus, and a local bus using any of a variety of commercially available bus architectures. The computer memory 1316 includes read only memory (ROM) 1320 and random access memory (RAM) 1322. A basic input/output system (BIOS), containing the basic routines that help to transfer information between elements within the computer 1312, such as during start-up, is stored in ROM 1320.

The computer 1312 may further include a hard disk drive 1324, a magnetic disk drive 1326, e.g., to read from or write to a removable disk 1328, and an optical disk drive 1330, e.g., for reading a CD-ROM disk 1332 or to read from or write to other optical media. The hard disk drive 1324, magnetic disk drive 1326, and optical disk drive 1330 are connected to the system bus 1318 by a hard disk drive interface 1334, a magnetic disk drive interface 1336, and an optical drive interface 1338, respectively. The computer 1312 typically includes at least some form of computer readable media. Computer readable media can be any available media that can be accessed by the computer 1312. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the computer 1312. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

A number of program modules may be stored in the drives and RAM 1322, including an operating system 1340, one or more application programs 1342, other program modules 1344, and program non-interrupt data 1346. The operating system 1340 in the computer 1312 can be any of a number of commercially available operating systems.

A user may enter commands and information into the computer 1312 through a keyboard 1348 and a pointing device, such as a mouse 1350. Other input devices (not shown) may include a microphone, an IR remote control, a joystick, a game pad, a satellite dish, a scanner, or the like. These and other input devices are often connected to the processing unit 1314 through a serial port interface 1352 that is coupled to the system bus 1318, but may be connected by other interfaces, such as a parallel port, a game port, a universal serial bus ("USB"), an IR interface, etc. A monitor 1354, or other type of display device, is also connected to the system bus 1318 via an interface, such as a video adapter 1356. In addition to the monitor, a computer typically includes other peripheral output devices (not shown), such as speakers, printers etc.

The computer 1312 may operate in a networked environment using logical and/or physical connections to one or more remote computers, such as a remote computer(s) 1358. The remote computer(s) 1358 may be a workstation, a server computer, a router, a personal computer, microprocessor based entertainment appliance, a peer device or other common network node, and typically includes many or all of the elements described relative to the computer 1312, although, for purposes of brevity, only a memory storage device 1360 is illustrated. The logical connections depicted include a local area network (LAN) 1362 and a wide area network (WAN) 1364. Such networking environments are commonplace in offices, enterprise-wide computer networks, intranets and the Internet.

When used in a LAN networking environment, the computer 1312 is connected to the local network 1362 through a network interface or adapter 1366. When used in a WAN networking environment, the computer 1312 typically includes a modem 1368, or is connected to a communications server on the LAN, or has other means for establishing communications over the WAN 1364, such as the Internet. The modem 1368, which may be internal or external, is connected to the system bus 1318 via the serial port interface 1352. In a networked environment, program modules depicted relative to the computer 1312, or portions thereof, may be stored in the remote memory storage device 1360. It will be appreciated that the network connections shown are exemplary and other means of establishing a communications link between the computers may be used.

Figure 14:
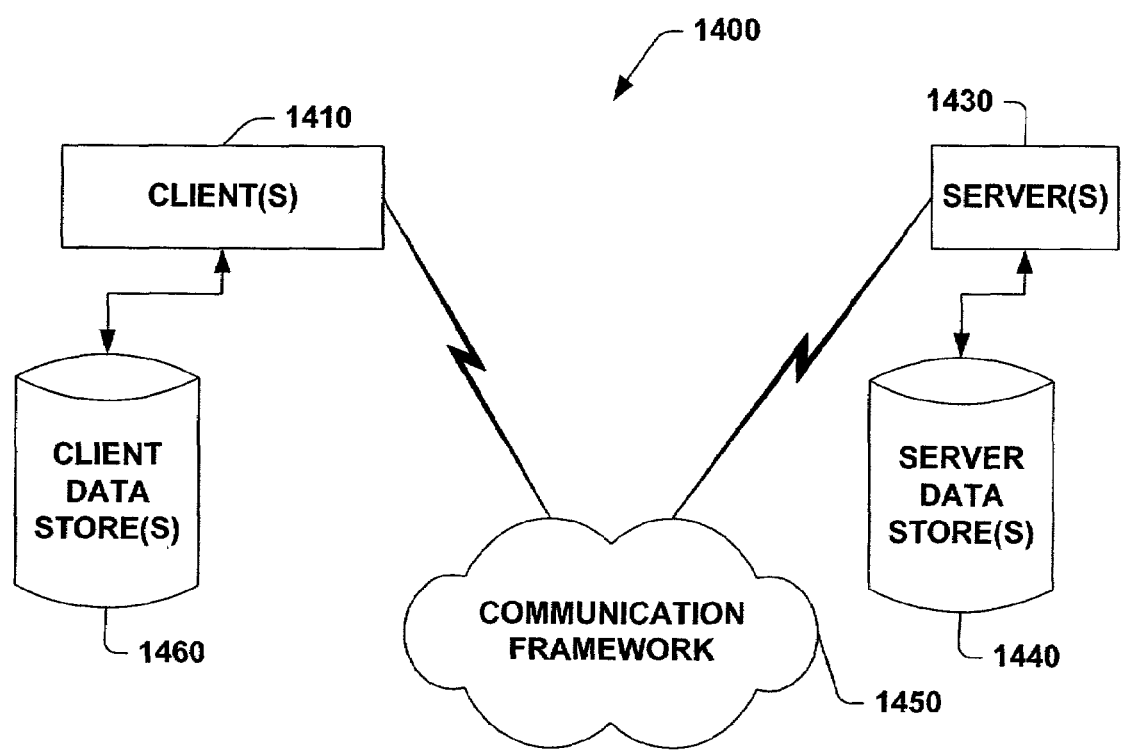
FIG. 14 is a schematic block diagram of an exemplary communication environment in accordance with the present invention.

FIG. 14 is a schematic block diagram of a sample computing environment 1400 with which the present invention can interact. The system 1400 includes one or more client(s) 1410. The client(s) 1410 can be hardware and/or software (e.g., threads, processes, computing devices). The system 1400 also includes one or more server(s) 1430. The server(s) 1430 can also be hardware and/or software (e.g., threads, processes, computing devices). The servers 1430 can house threads to perform transformations by employing the present invention, for example. One possible communication between a client 1410 and a server 1430 may be in the form of a data packet adapted to be transmitted between two or more computer processes. The system 1400 includes a communication framework 1450 that can be employed to facilitate communications between the client(s) 1410 and the server(s) 1430. The client(s) 1410 are operably connected to one or more client data store(s) 1460 that can be employed to store information local to the client(s) 1410. Similarly, the server(s) 1430 are operably connected to one or more server data store(s) 1440 that can be employed to store information local to the servers 1430.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An encoding system comprising:
   a tarp filter that adaptively computes probabilities for transform coefficients of an image, the probabilities being a function of a coefficient value and a decreasing function of a distance of previously coded transform coefficients; and
   an arithmetic encoder that encodes transform coefficients utilizing the probabilities.

2. The system of claim 1, further comprising a transform component that transforms pixels of the image into the transform coefficients.

3. The system of claim 2, further comprising a quantizer component that quantizes the transform coefficients by a quantization value.

4. The system of claim 1, the transform coefficients being wavelet coefficients.

5. The system of claim 1, the transform coefficients being lapped transform coefficients.

6. The system of claim 1, the transform coefficients being organized into bands HL0, LH0 and HH0, the bands being high resolution.

7. The system of claim 1, the transform coefficients being organized into bands HL1, LH1, and HH1, the bands being medium resolution.

8. The system of claim 1, the transform coefficients being pixel values of the image.

9. The system of claim 1, the tarp filter further operative to generate a probability density function.

10. The system of claim 1, the tarp filter further comprising a learning rate parameter to adjust an adaptation rate of the tarp filter to the probabilities of previously coded coefficients, the learning rate parameter being adjustable.

11. The system of claim 1, the tarp filter further comprising a learning rate parameter to adjust an adaptation rate of the tarp filter according probabilities of previously coded coefficients, the learning rate parameter being dynamically adjustable.

12. The system of claim 1, the tarp filter being isotropic with respect to direction.

13. The system of claim 1, further comprising a storage component that stores probabilities of previously coded coefficients.

14. An adaptive filter system comprising:
a learning rate component that stores a learning rate parameter;
an observed value component that provides an observed values of coefficients;
a previously coded values component that stores previously computed probabilities; and
an estimator that generates probabilities for the coefficients as a function of a learning rate parameter, the observed values, the previously computed probabilities and distances of the previously computed probabilities.

15. The system of claim 14, the learning rate component dynamically modifies the learning rate parameter.

16. The system of claim 14, the previous computed probabilities being previous computed probabilities of a current line.

17. The system of claim 14, the previously computed probabilities being previously computed probabilities of substantially all of the coefficients.

18. An adaptive filter system comprising:
a first filter that processes lines of an image, respective lines comprising coefficients, the coefficients having a probability computed as a function of a probability of a previous pixel;
a second filter that processes columns of the image, the probability of coefficients being updated as a function of the probability of above pixel; and
a third filter that processes the lines of the image after the coefficients of that line have been processed, and in an opposite direction of the first filter, the probability of coefficients being updated as a function of the previous pixel.

19. The system of claim 18, further comprising a learning rate component that stores a learning rate parameter.

20. The system of claim 19, further comprising an observed value component that stores observed values of coefficients, the observed values being provided to the first filter.

21. The system of claim 18, the first filter updates the probability of the next pixel as a function of an observed value of the current coefficient.

22. The system of claim 19, the first filter computes probability as a function of the learning rate parameter.

23. The system of claim 18, the first filter processes the lines of the image from left to right, the second filter processes the lines of the image from top to bottom and the third filter processes the columns of the image from right to left.

24. The system of claim 19, utilizing a set of equations for the first and second filter:

$$p[i, j] = (p1[i, j-1] + p2[i-1, j])'a$$

$$p1[i, j] = v[i, j]'(1-a)^2/(2a) + p1[i, j-1]'a$$

$$p2[i, j] = p1[i, j] + p2[i-1, j]'a$$

where p is a probability one of the coefficients, v is an observed value, p1[i, j−1 ] is a probability of a previous pixel and p2[i−1, j] is a probability of an above pixel, and a is the learning rate parameter.

25. The system of claim 20, utilizing a set of equations for the third filter:

$$p2[i, j] = p2[i, j] + p3[i, j+1]'a$$

$$p3[i, j] = v[i, j]'(1-a)^2/(2a) + p3[i, j+1]'a$$

where v is an observed value, p2 is an update probability of the previous pixel and p3 is an update of the above pixel and a is the learning rate parameter.

26. An encoding system comprising:
a tarp filter that generates a probability of a current coefficient;
a context predictor that generates a probability of a current coefficient;
a select component that selects one of the probability generated by the tarp filter and the probability generated by the context predictor as a selected probability; and
an encoder that encodes the current coefficient utilizing the selected probability.

27. The system of claim 26, the tarp filter utilizes a learning rate parameter, an observed value and a subset of previously computed probabilities to generate the probability of the current coefficient.

28. The system of claim 26, the context predictor being trained offline to generate a fixed context, the fixed context utilized to compute the probability of the current coefficient.

29. The system of claim 26, the select component employs a gating function for the selected probability.

30. A method of encoding a document comprising:
transforming pixels of an image into coefficients;
quantizing the coefficients;
generating probabilities for the coefficients based at least partly a subset of previously computed probabilities of previously encoded coefficients and distances of the previously encoded coefficients; and
encoding the coefficients into a bitstream by utilizing the generated probabilities.

31. The method of claim 30, wherein transforming the pixels comprises transforming the pixels into wavelet coefficients.

32. The method of claim 30, wherein transforming the pixels comprises transforming the pixels into lapped transform coefficients.

33. The method of claim 32, wherein transforming the pixels further comprises organizing the coefficients into bands, the bands comprising LH, HL and HH.

34. The method of claim 30, wherein quantizing the coefficients comprises dividing the coefficients by a quantization parameter and rounding up to a nearest integer.

35. The method of claim 34, the quantization parameter selected to increase compression.

36. The method of claim 30, wherein generating probabilities comprises utilizing a learning parameter, the learning parameter controlling how quickly the probabilities adapt to the previously computed probabilities and observed values.

37. A method of operating a tarp filter comprising:
determining a learning rate parameter;
receiving at least one previously computed probability; and
computing a probability of the current coefficient based on the at least one previously computed probability and a distance of the at least one previously computed probability.

38. The method of claim 37, further comprising encoding the current coefficient according to the computed probability of the current coefficient.

39. The method of claim 38, further comprising obtaining an observed value of the current coefficient.

40. The method of claim 39, further comprising updating the probability of the current coefficient based at least partly on the observed value of the current coefficient.

41. The method of claim 37, wherein the at least one previously computed probability comprises a probability of a previous coefficient.

42. The method of claim 41, wherein the at least one previously computed probability further comprises a probability of an above coefficient.

43. The method of claim 37, the learning rate parameter being predetermined.

44. The method of claim 37, the learning rate parameter being dynamically determined.

45. A computer readable medium storing computer executable instructions of components operable to perform a method of encoding, comprising:
a component for transforming pixels of an image into coefficients;
a component for quantizing the coefficients;
a component for generating probabilities for the coefficients based at least partly on substantially all previously computed probabilities of previously encoded coefficients and distances of substantially all previously computed probabilities; and
a component for encoding the coefficients into a bitstream by utilizing the generated probabilities.

46. A computer readable medium storing computer executable instructions of components operable to generate probabilities comprising:
a component for determining a learning rate parameter;
a component for receiving at least one previously computed probability; and
a component for computing a probability of the current coefficient based on the at least one previously computed probability and a distance of the at least one previously computed probability.

47. An encoding system comprising:
a probability estimator that adaptively computes probabilities for transform coefficients of an image, the probabilities being a function of a coefficient value and a decreasing function of a distance of previously coded transform coefficients; and
an entropy coder that encodes transform coefficients utilizing the probabilities.

48. The system of claim 47, the entropy coder being an arithmetic coder.

49. The system of claim 48, the probability estimator computes probabilities for one symbol at a time.

50. The system of claim 47, the probability estimator computes the probability of a series of coefficients being zero.

51. The system of claim 50, the entropy coder uses a run-length encoding method.

52. The system of claim 47, the probability estimator assumes the transform coefficients are distributed according to a previously decided probability distribution function.

53. The system of claim 52, the previously decided probability density function is assumed to be Laplacian.

54. The system of claim 52, specific parameters of the previously decided probability density function for each coefficient are computed based on previously transmitted coefficients.

55. The system of claim 52, a variance of the previously decided probability density function is computed based on previously transmitted coefficients.

56. The system of claim 55, the variance is computed using a tarp filter.

57. The system of claim 52, a plurality of estimates for each parameter of the previously decided probability density function are computed and averaged.

58. The system of claim 57, the plurality of estimates are averaged according to different weights.

59. The system of claim 57, at least one of the plurality of estimates uses only samples already encoded in a present row or column.

60. The system of claim 57, at least one of the plurality of estimates uses samples from other previously encoded bands.

61. The system of claim 47, the coefficients are transmitted bitplane by bitplane.

62. The system of claim 61, at least one of the plurality of estimates uses samples from a previously encoded bitplane.

63. The system of claim 61, at least one of the plurality of estimates uses samples from a previously encoded bitplane.

64. The system of claim 57, three variance estimates being computed.

65. The system of claim 64, one of the three variance estimates is computed based only on coefficients from the current row.

66. The system of claim 64, one of the three variance estimates is computed based only on coefficients from rows already completely encoded.

67. The system of claim 64, one of the three variance estimates is computed based only on coefficients from a band already completely encoded.

68. The system of claim 47, the probability estimator computes only as much information as needed by the entropy coder.

69. A system comprising:
an decoding system comprising:
a probability estimator that adaptively computes probabilities for transform coefficients of an image, the probabilities being a function of probabilities of previously decoded transform coefficients and a decreasing function of a distance of previously decoded transform coefficients; and
an entropy decoder that decodes transform coefficients utilizing the probabilities.

* * * * *